United States Patent [19]
Shikama

[11] Patent Number: 5,926,321
[45] Date of Patent: Jul. 20, 1999

[54] OCULAR OPTICAL SYSTEM AND OCULAR IMAGE DISPLAY APPARATUS

[75] Inventor: Shinsuke Shikama, Tokyo, Japan

[73] Assignee: Mitsubishi Denki Kabushiki Kaisha, Tokyo, Japan

[21] Appl. No.: 08/990,322

[22] Filed: Dec. 11, 1997

[30] Foreign Application Priority Data

Dec. 24, 1996 [JP] Japan .................................. 8-343500

[51] Int. Cl.$^6$ ............................ G02B 25/00; G02B 27/14
[52] U.S. Cl. .......................... 359/644; 359/630; 359/715; 359/774
[58] Field of Search ..................................... 359/630, 643, 359/644, 648, 649, 650, 708, 715, 754, 771, 774

[56] References Cited

U.S. PATENT DOCUMENTS

| | | | |
|---|---|---|---|
| 3,768,890 | 10/1973 | Osawa et al. | 359/644 |
| 5,691,850 | 11/1997 | Arisaka | 359/644 |

FOREIGN PATENT DOCUMENTS

| | | |
|---|---|---|
| 40-9090 | 3/1940 | Japan . |
| 50-151163 | 12/1975 | Japan . |
| 51-120231 | 10/1976 | Japan . |
| 52-72242 | 6/1977 | Japan . |
| A-3 87709 | 4/1991 | Japan . |

Primary Examiner—Huy Mai

[57] ABSTRACT

An ocular optical system to be placed in front of a human eye forms a magnified virtual image of an original image displayed on a two-dimensional display element. The system has, in order from the eye: a positive first lens group including, in order from the eye, a meniscus first lens which has a concave surface directed toward the eye and a positive meniscus second lens which has a concave surface. A convex surface of the first lens directed toward the second lens and the concave surface of the second lens have the same radius of curvature and are bonded to each other. The system also has a second lens group including an aspherical third lens which has aspherical surfaces on both sides and has a negative on-axis refracting power; a third lens group including an aspherical fourth lens which has aspherical surfaces on both sides and has a positive on-axis refracting power; and a positive fourth lens group including, in order from the eye, a positive biconvex fifth lens and a negative biconcave sixth lens. A convex surface of the fifth lens directed toward the sixth lens and a concave surface of the sixth lens directed toward the fifth lens have the same radius of curvature and are bonded to each other.

16 Claims, 23 Drawing Sheets

OCULAR OPTICAL SYSTEM AND OCULAR IMAGE DISPLAY APPARATUS

BACKGROUND OF THE INVENTION

The present invention relates to an ocular optical system and an ocular image display apparatus incorporating such the ocular optical system which is to be placed in front of a human eye, for example, by being held on a head or a face of a user.

A conventional ocular image display apparatus of either helmet or goggle type which is held on a head or a face of a user is recently developed for virtual reality use or for personal enjoyment of a large picture. In such the apparatus, a magnified virtual image of an original image displayed on a small size display element such as a liquid crystal display (LCD) element and an electroluminescent display (ELD) element is formed by an ocular optical system such as an eyepiece. The conventional ocular image display apparatus to be worn in front of the user's eyes which incorporates such the ocular optical system is schematically shown in FIG. 16.

In FIG. 16, reference numerals 3 represent two-dimensional display elements for displaying an original image, reference numerals 20 represent eyepieces for projecting a magnified virtual images of the original images in midair, and reference numerals 10 represent eyes or eyeballs of a human being as a viewer H. In the apparatus of FIG. 16, the magnified virtual images of the small size original images are formed by the eyepieces 20 and are viewed by the eyes 10 of the viewer H.

The eyepieces as the prior art ocular optical systems are used in microscopes, binoculars, telescopes and viewfinders, for example, as shown in Japanese Utility Model Kokoku Publication No. 9090/1965, and Japanese Patent Kokai Publications No. 151163/1975, No. 120231/1976, No. 72242/1977 and No. 87709/1991.

It is essential for the ocular image display apparatus of a head or face mount type that the overall size and the weight be reduced in order to present comfortable fit to the viewer. Further, securing an increased angle of view is essential in order to promote viewer's feeling as if the viewer is within the scene, and it is no exaggeration to say that such the viewer's feeling is governed by the presented angle of view. In order to impart to the above-mentioned viewer's feeling, for example, the feelings of three-dimension, dynamism and absorption, it is desirable that the maximum angle of view of the displayed image in the diagonal direction image is equal to or above 100°.

Further, if the design pupil diameter of the ocular optical system at eye point is small, the freedom of the pupil is reduced. Therefore, if a slight shift occurs in the close contact mounting of the ocular image display apparatus, a dark area appears in a marginal area around the field of sight being viewed, thereby detracting from the viewer's feeling as if the viewer is within the scene, which is undesirable. Accordingly, it is required to choose a small F-number for the ocular optical system.

However, when an increased angle of view and a small F-number are used in the ocular optical system of the ocular image display apparatus, ray of light passes through a peripheral region of the ocular optical system, thereby increasing the magnitudes of aberrations. Therefore, a correction of aberrations is difficult to achieve with a compact construction, and combined with the influence of the curvature of an image surface, the resolution of peripheral image portions is degraded.

With a compact eyepiece as the ocular optical system which has a reduced number of lenses, the choice of an arrangement that a positive lens be disposed at a high elevation point of the ray and a negative lens be disposed at a low elevation point to achieve a reduced Petzval's sun through the distribution of positive and negative power is inhibited, thus rendering a difficulty in the correction of the curvature of the image surface.

Further, it is desirable for the ocular optical system of the ocular image display apparatus to satisfy all of the following conditions:

(A) an angle of view equal to or greater than 100° diagonally;

(B) a small F-number (a large pupil diameter);

(C) an appropriate eye relief (a distance between a viewer's eye and a first surface nearest to the viewer's eyes of the eyepiece); and (D) a good correction of aberrations.

Although the conventional eyepiece as the ocular optical system secure a relatively large angle of view on the order of 50° to 70°, it fails to satisfy the above conditions (A) to (D) simultaneously which are essential to realize the satisfactory viewer's feeling of his presence within the scene for virtual reality use and an actual ease of use.

Accordingly, if the prior art eyepiece mounted on the ocular image display apparatus, it is impossible to simultaneously achieve an increased angle of view, the freedom of a large pupil position and a sharp image exhibiting a good flatness up to the periphery.

SUMMARY OF THE INVENTION

It is an object of the present invention to provide an ocular optical system capable of presenting an increased angle of view equal to or greater than 100° for a singe eye, large freedom of a pupil position which is achieved with an appropriate pupil diameter and eye relief, and a sharp and flat image even at the periphery.

It is another object of the present invention to provide an ocular image display apparatus, in which the ocular optical system as an eyepiece is mounted, capable of presenting an increased angle of view, thereby achieving the viewer's feeling of his presence within the scene, presenting a sharp picture display, and achieving a small size and a reduced weight.

According to the present invention, an ocular optical system to be placed in front of a human eye for forming a magnified virtual image of an original image displayed on a two-dimensional display element, comprises, in order from the eye: a positive first lens group including, in order from the eye, a meniscus first lens which has a concave surface directed toward the eye and a positive meniscus second lens which has a concave surface, a convex surface of the first lens directed toward the second lens and the concave surface of the second lens having the same radius of curvature and being bonded to each other; a second lens group including an aspherical third lens which has aspherical surfaces on both sides and has a negative on-axis refracting power; a third lens group including an aspherical fourth lens which has aspherical surfaces on both sides and has a positive on-axis refracting power; and a positive fourth lens group including, in order from the eye, a positive biconvex fifth lens and a negative biconcave sixth lens, a convex surface of the fifth lens directed toward the sixth lens and a concave surface of the sixth lens directed toward the fifth lens having the same radius of curvature and being bonded to each other.

Further, according to another aspect of the present invention, an ocular image display apparatus to be placed in front of a human eye, comprises: a two-dimensional display element on which an original image is displayed; and an ocular optical system for forming a magnified virtual image of the original image displayed on the two-dimensional display element. The ocular optical system comprises, in order from the eye: a positive first lens group including, in order from the eye, a meniscus first lens which has a concave surface directed toward the eye and a positive meniscus second lens which has a concave surface, a convex surface of the first lens directed toward the second lens and the concave surface of the second lens having the same radius of curvature and being bonded to each other; a second lens group including an aspherical third lens which has aspherical surfaces on both sides and has a negative on-axis refracting power; a third lens group including an aspherical fourth lens which has aspherical surfaces on both sides and has a positive on-axis refracting power; and a positive fourth lens group including, in order from the eye, a positive biconvex fifth lens and a negative biconcave sixth lens, a convex surface of the fifth lens directed toward the sixth lens and a concave surface of the sixth lens directed toward the fifth lens having the same radius of curvature and being bonded to each other.

A peripheral part of the third lens may have a concave surface directed toward the eye. Further, a peripheral part of the fourth lens may have a concave surface directed toward the eye.

Furthermore, it is desirable for the ocular optical system to satisfy the following conditions:

$1.4 < f_1/f < 2.1$ $3.8 < |f_2|/f < 5.4$ $2.3 < f_3/f < 3.7$ $5 < f_4/f < 450$ where $f_1$, $f_2$, $f_3$ and $f_4$ represent on-axis focal lengths of the first lens group, the second lens group, the third lens group and the fourth lens group, respectively, and f represents a focal length of the whole ocular optical system.

Moreover, it is desirable for the ocular optical system to satisfy the following condition:

$1.1 < f_{12}/f_{34} < 2.2$ where $f_{12}$ represents a composite on-axis focal length of a combination of the first lens group and the second lens group, and $f_{34}$ represents a composite on-axis focal length of a combination of the third lens group and the fourth lens group.

Further, it is desirable for the ocular optical system to satisfy the following conditions:

$v_2 < 30$ $v_3 > 35$ where $v_2$ represents Abbe number of glass material forming the first lens, and $v_3$ represents Abbe number of glass material forming the second lens.

Furthermore, it is desirable for the ocular optical system to satisfy the following conditions:

$v_5 < 30$ $v_7 > 40$ where $v_5$ represents Abbe number of glass material forming the third lens, and $v_7$ represents Abbe number of glass material forming the fourth lens.

It is desirable for the ocular optical system to satisfy the following conditions:

$v_9 > 35$ $v_{10} < 25$ where $v_9$ represents Abbe number of glass material forming the fifth lens, and $v_{10}$ represents Abbe number of glass material forming the sixth lens.

BRIEF DESCRIPTION OF THE DRAWINGS

The present invention will become more fully understood from the detailed description given hereinbelow and the accompanying drawings which are given by way of illustration only, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

Embodiments 1 to 7

Ocular optical systems according the Embodiments 1 to 7 of the present invention, which can be mounted in an ocular image display apparatus, will be described with reference to the accompanying drawings. FIG. 1 to FIG. 7 are cross sectional views showing the ocular optical systems to be placed in front of a human eye according to the Embodiments 1 to 7, respectively. Further, Table 1 to Table 7 to be described later show numeral data in the Embodiments 1 to 7, respectively.

Figure 1:
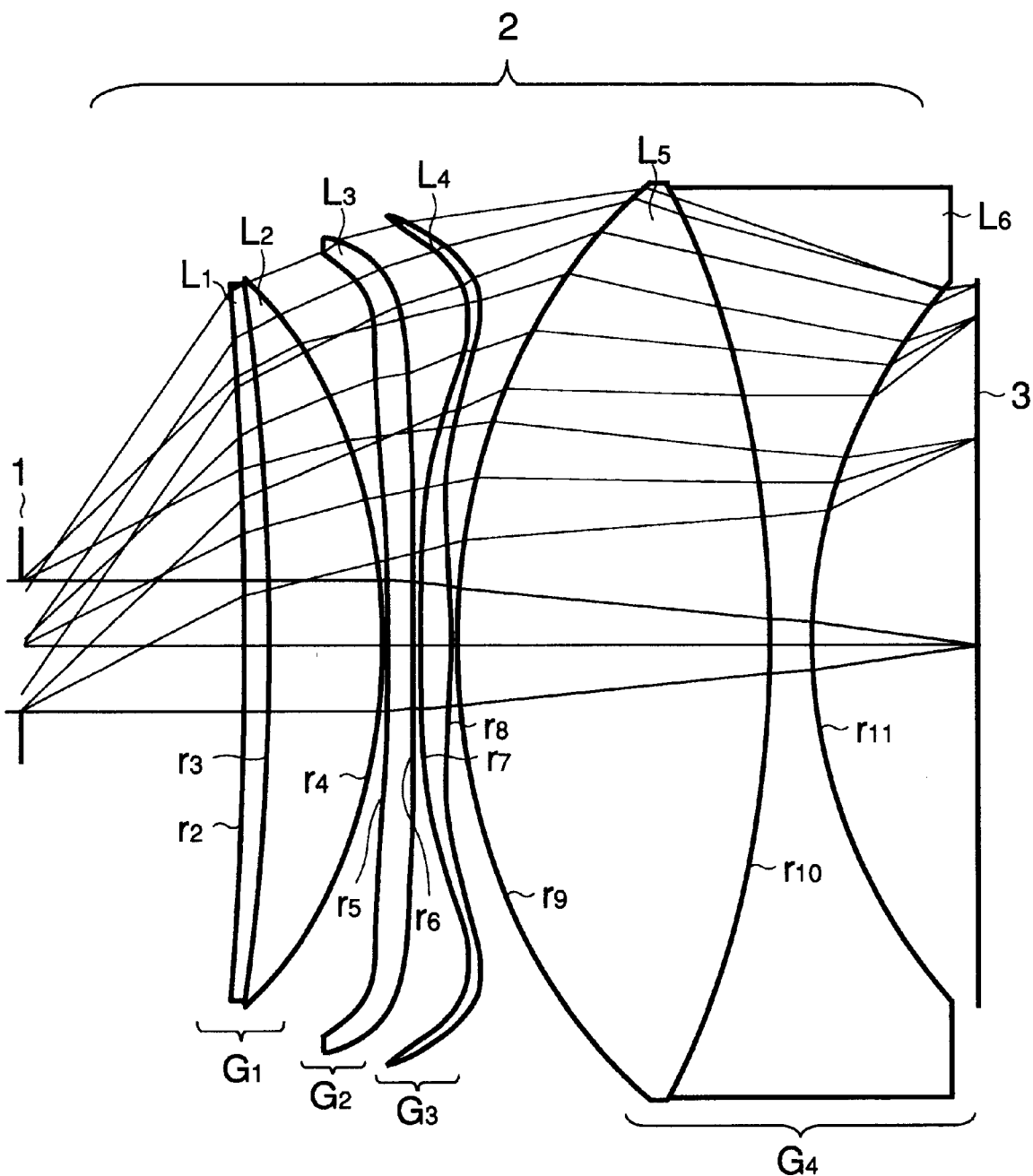
FIG. 1 is a cross sectional view of an ocular optical system according to an Embodiment 1 of the present invention.
Figure 2:
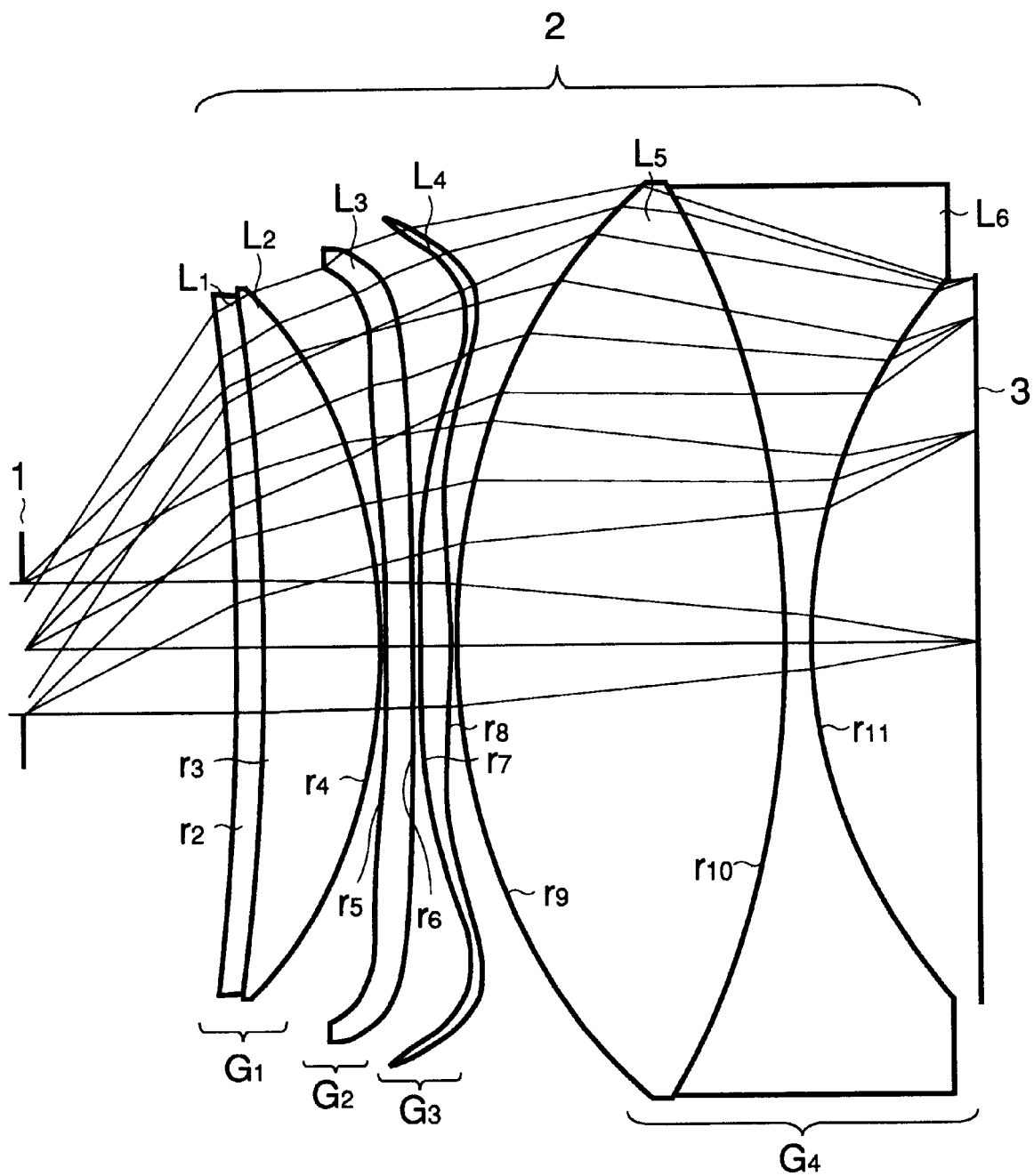
FIG. 2 is a cross sectional view of an ocular optical system according to an Embodiment 2 of the present invention.
Figure 3:
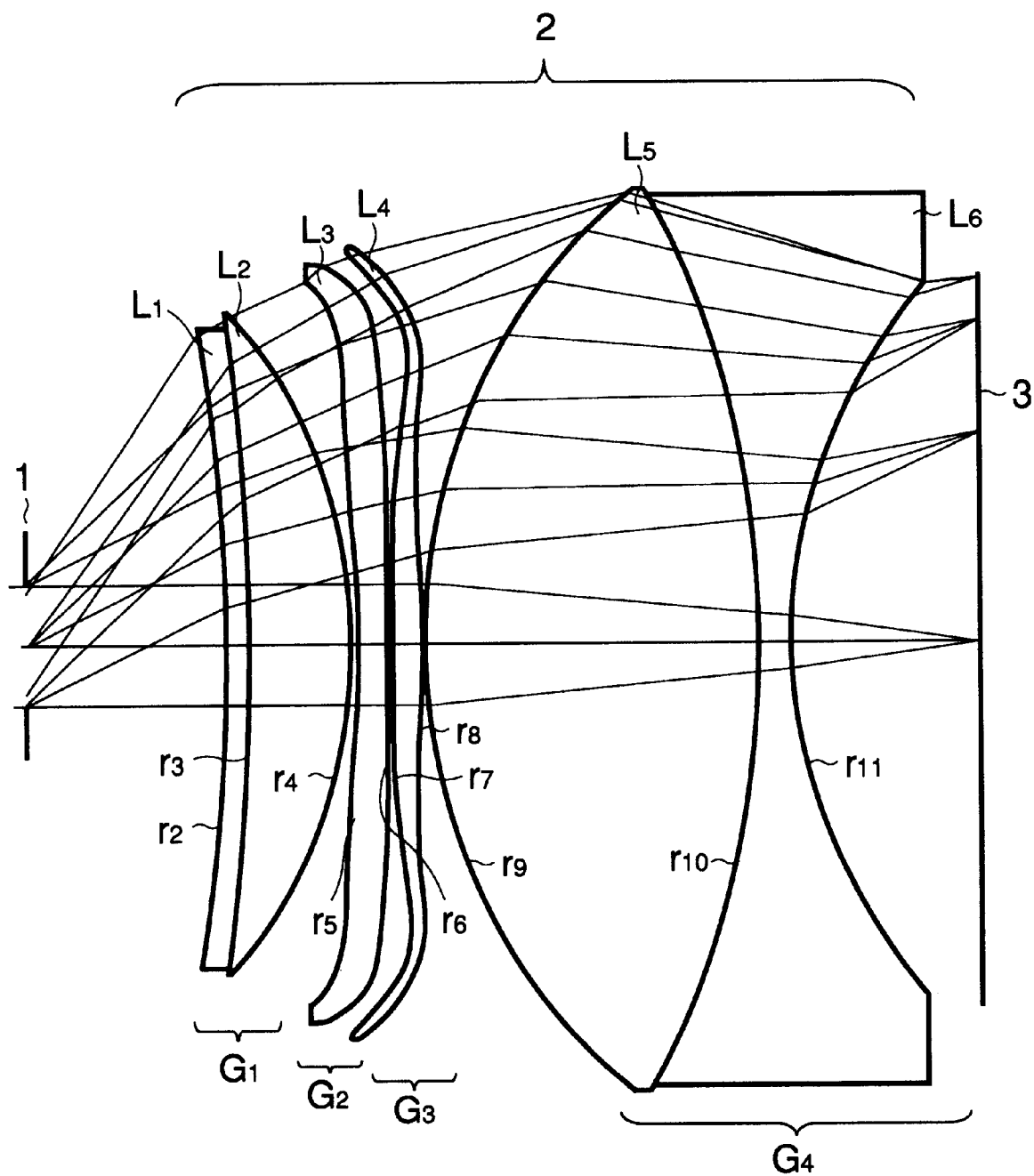
FIG. 3 is a cross sectional view of an ocular optical system according to an Embodiment 3 of the present invention.
Figure 4:
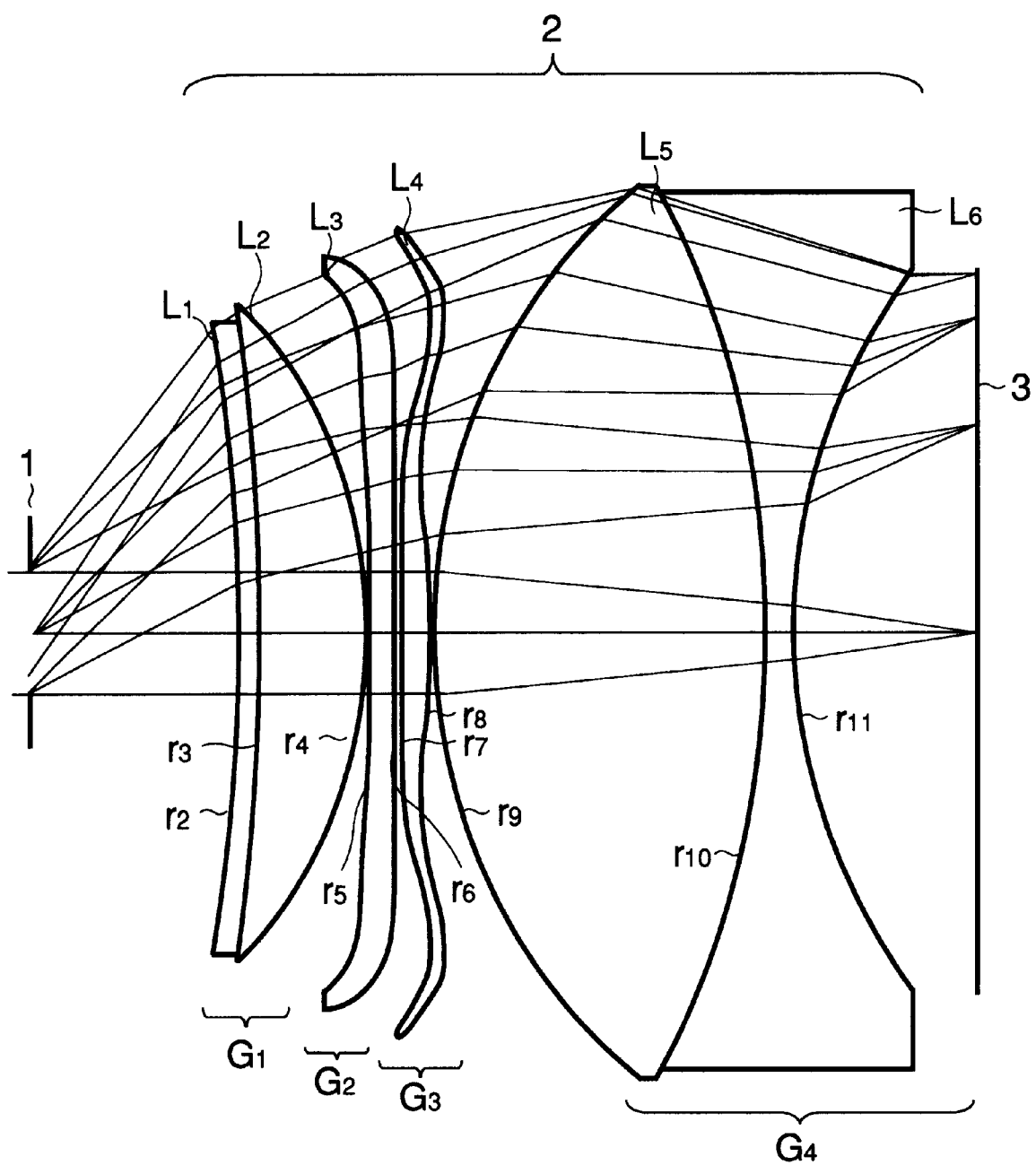
FIG. 4 is a cross sectional view of an ocular optical system according to an Embodiment 4 of the present invention.
Figure 5:
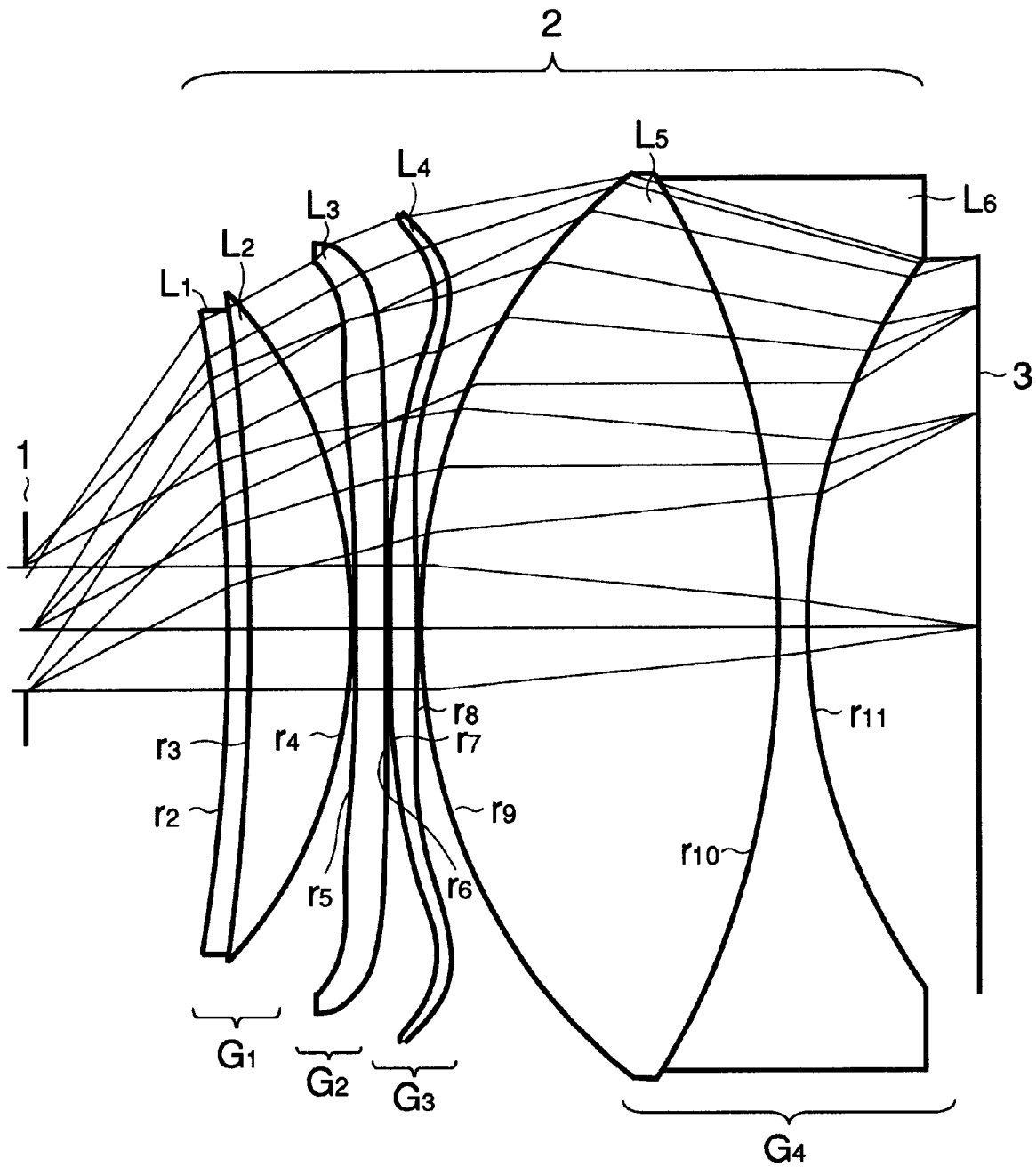
FIG. 5 is a cross sectional view of an ocular optical system according to an Embodiment 5 of the present invention.
Figure 6:
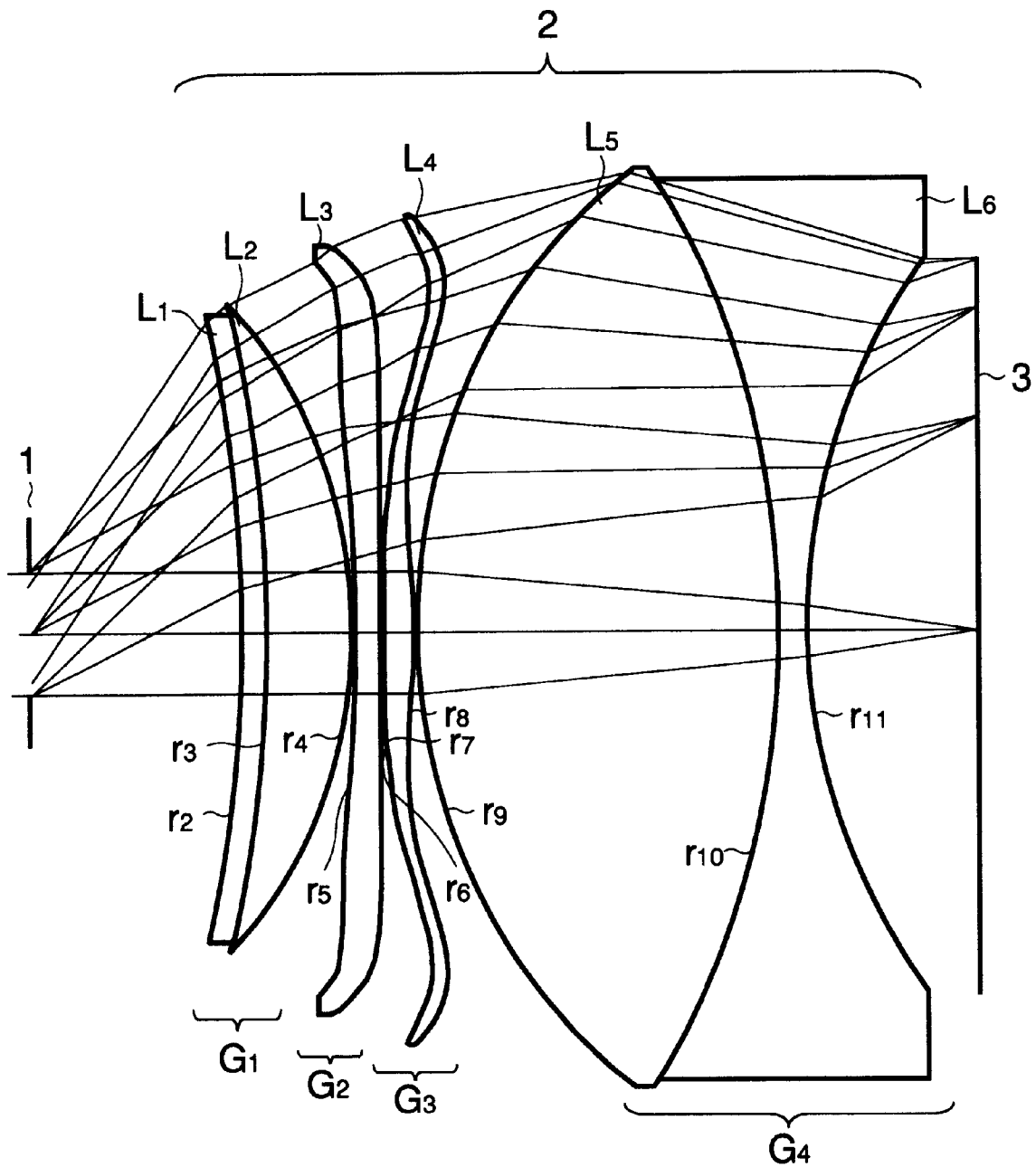
FIG. 6 is a cross sectional view of an ocular optical system according to an Embodiment 6 of the present invention.
Figure 7:
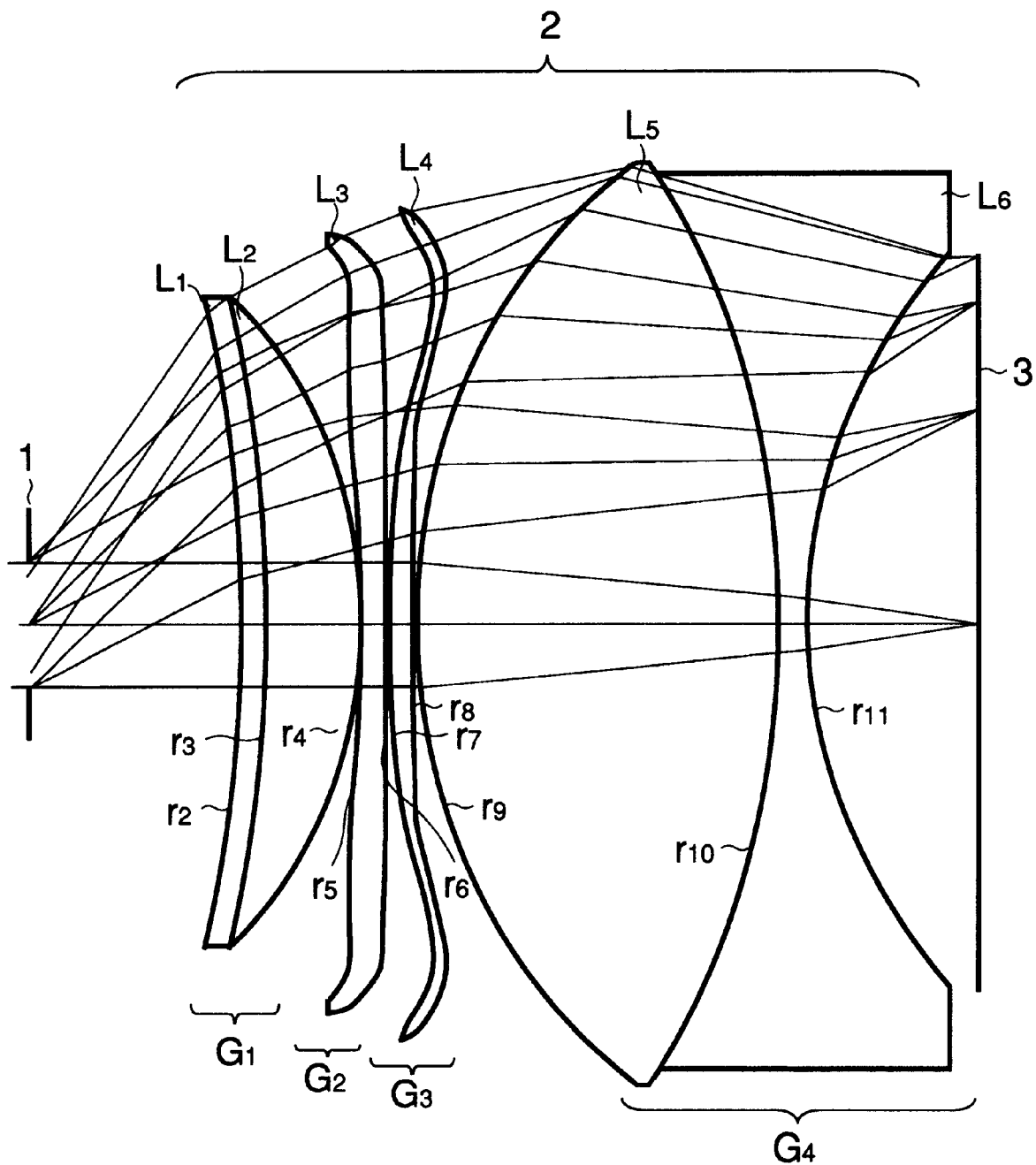
FIG. 7 is a cross sectional view of an ocular optical system according to an Embodiment 7 of the present invention.
Figure 8A:
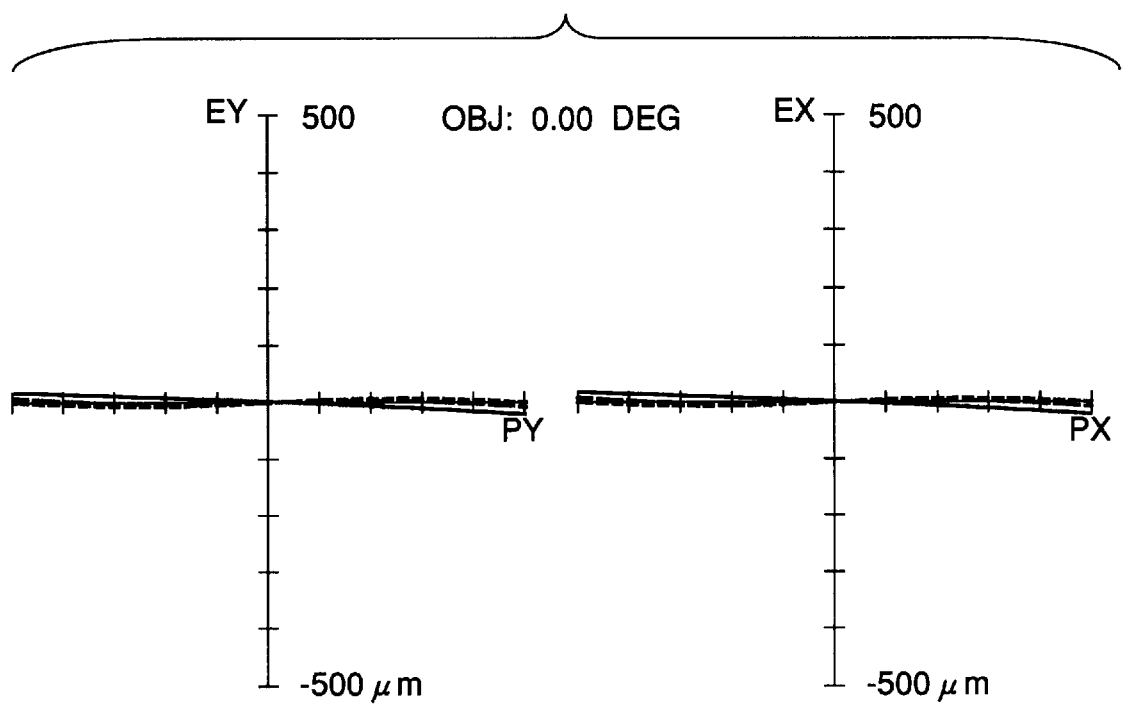
FIGS. 8A, 8B, 8C and 8D shows lateral aberrations of the ocular optical system according to the Embodiment 1.
Figure 8B:
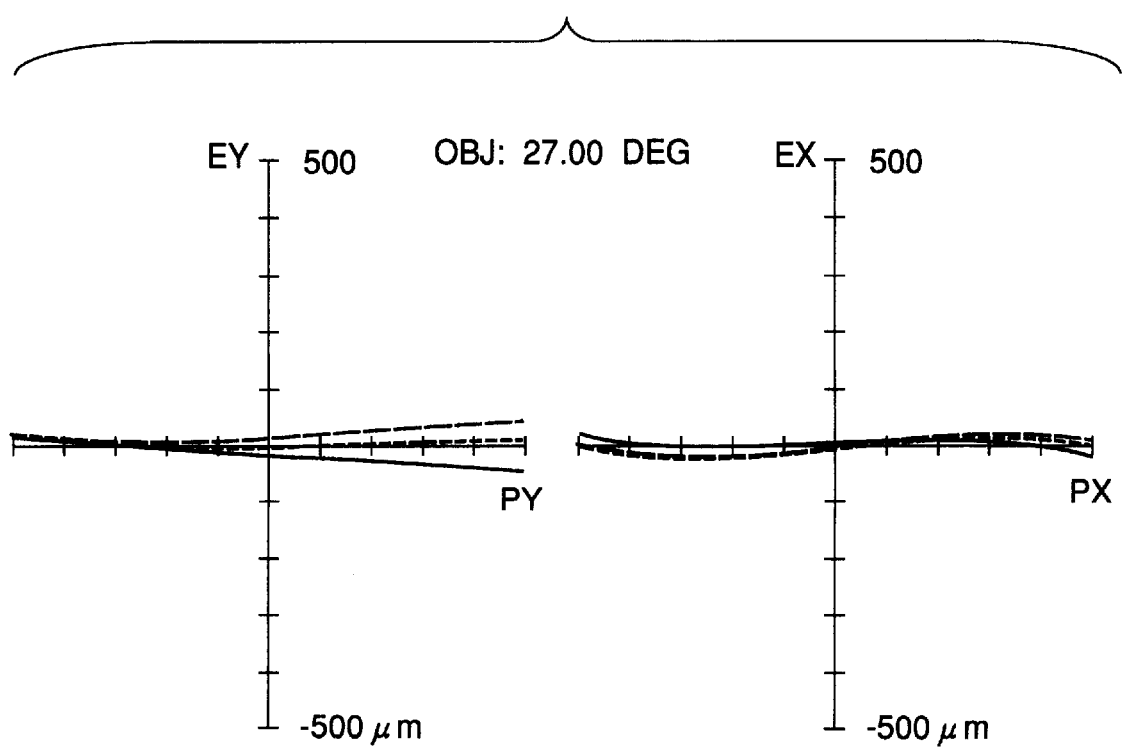
Figure 8C:
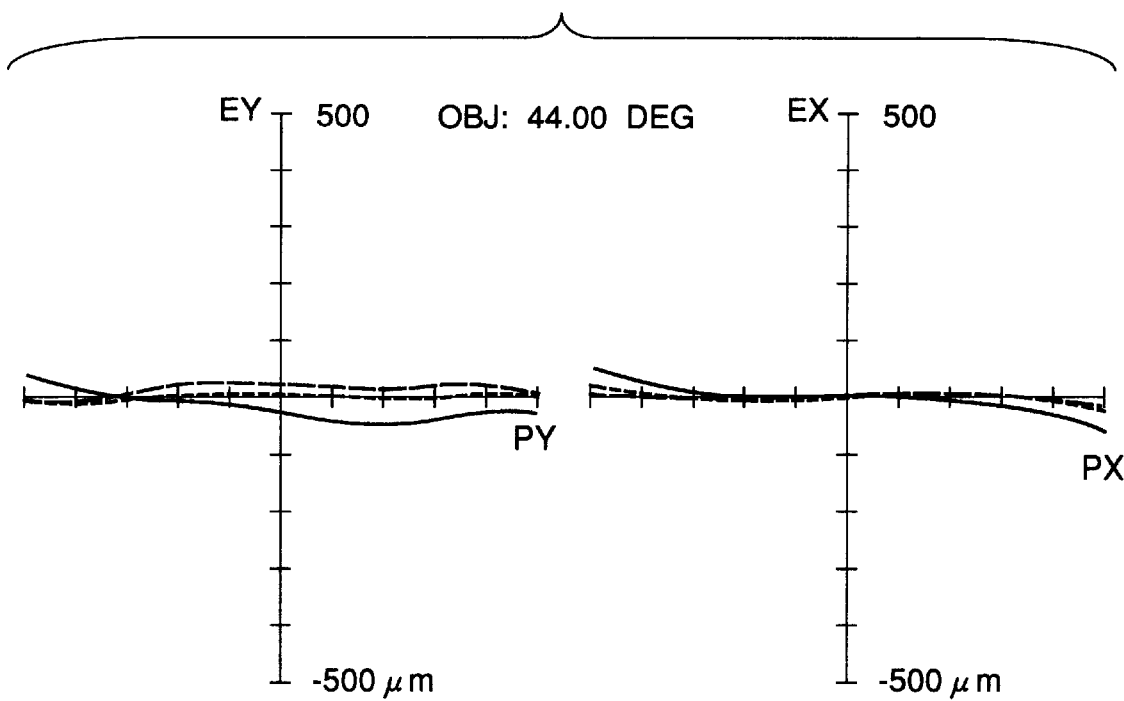
Figure 8D:
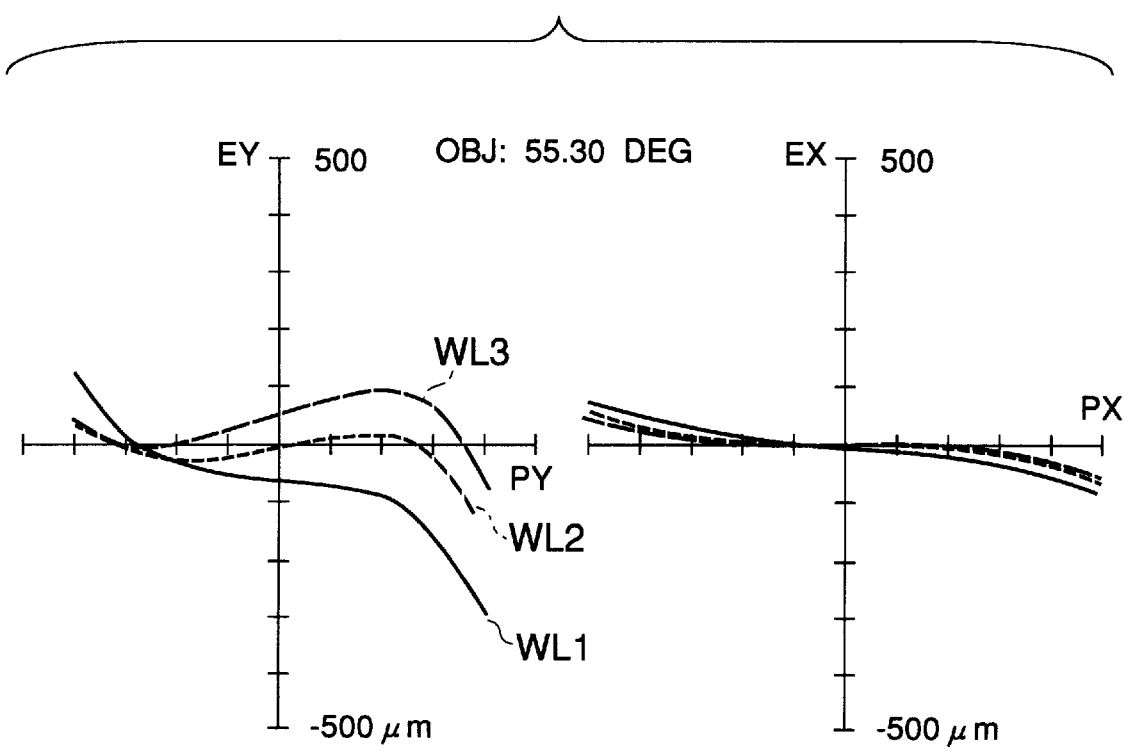
Figure 9A:
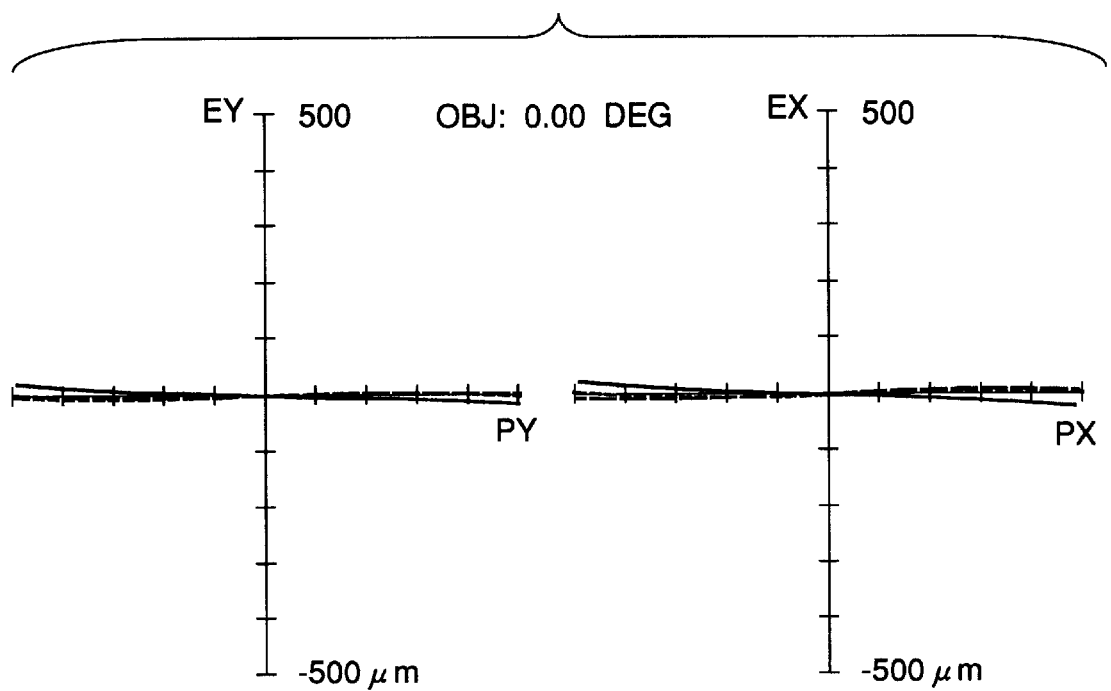
FIGS. 9A, 9B, 9C and 9D shows lateral aberrations of the ocular optical system according to the Embodiment 2.
Figure 9B:
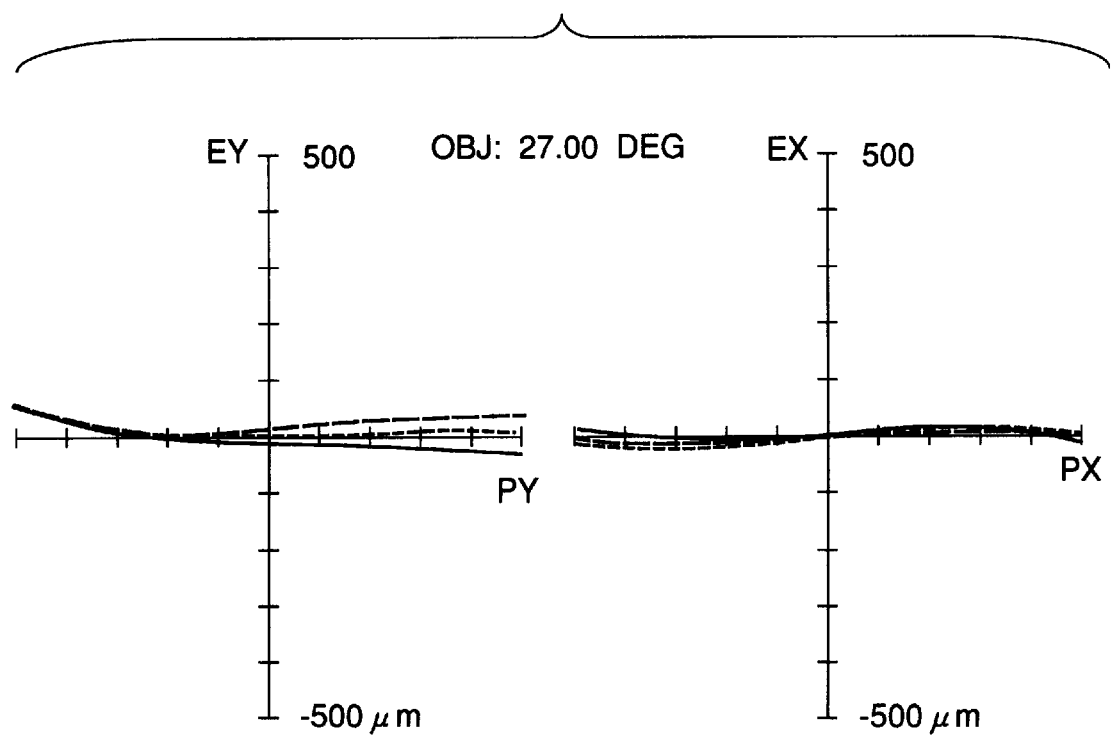
Figure 9C:
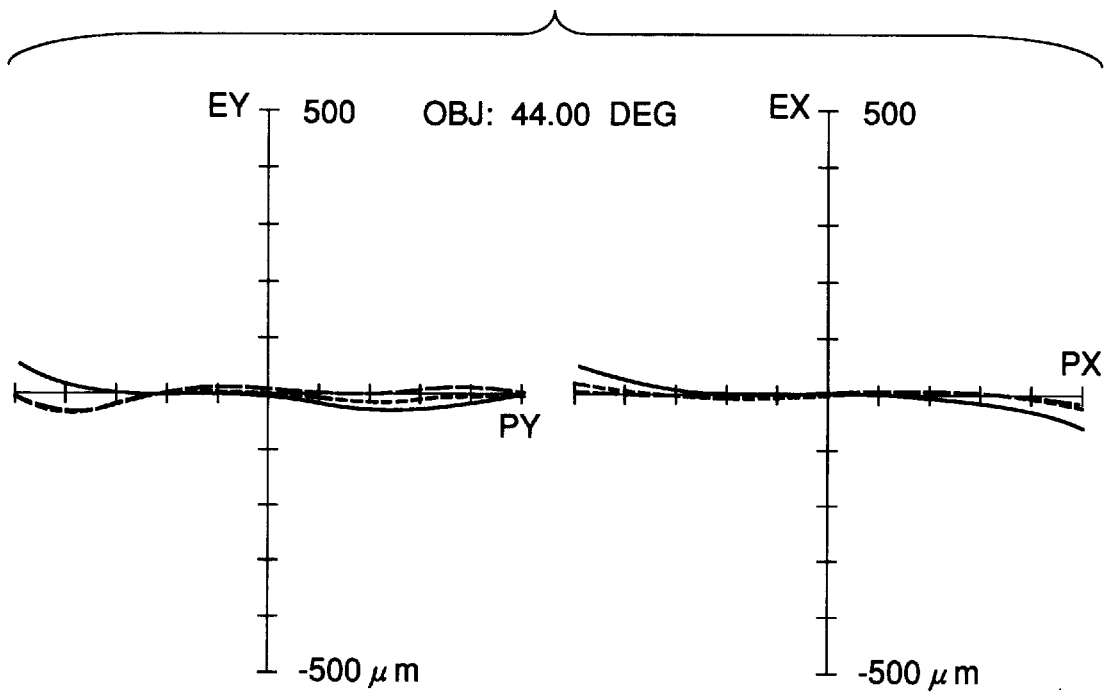
Figure 9D:
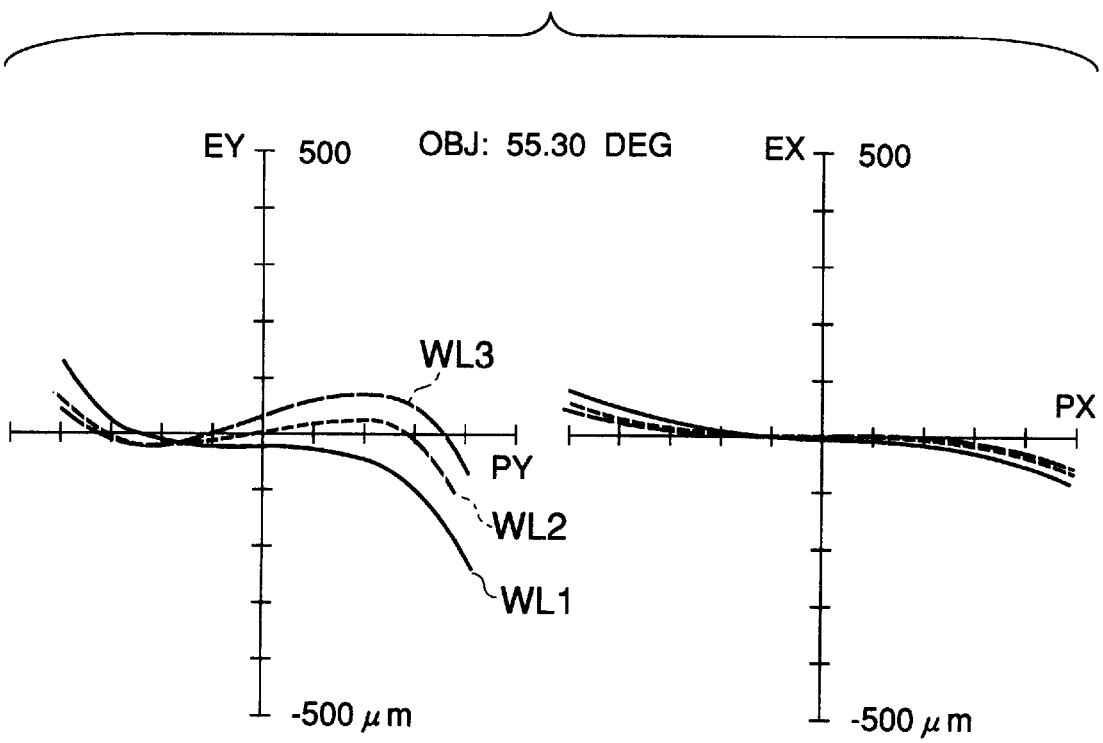
Figure 10A:
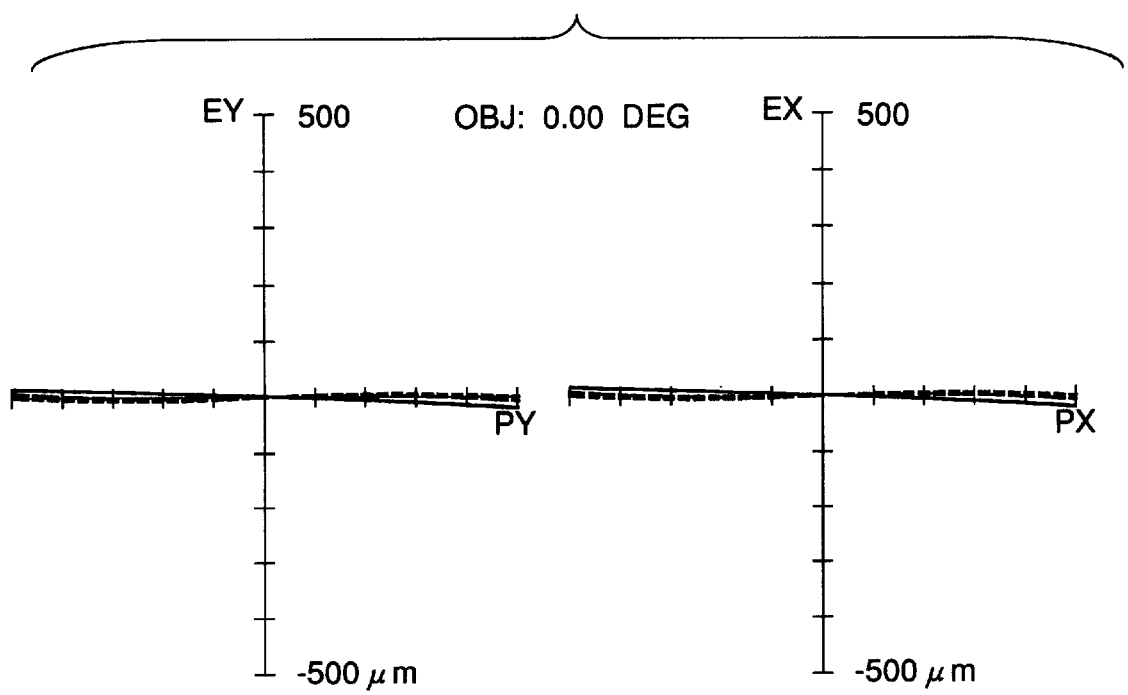
FIGS. 10A, 10B, 10C and 10D shows lateral aberrations of the ocular optical system according to the Embodiment 3.
Figure 10B:
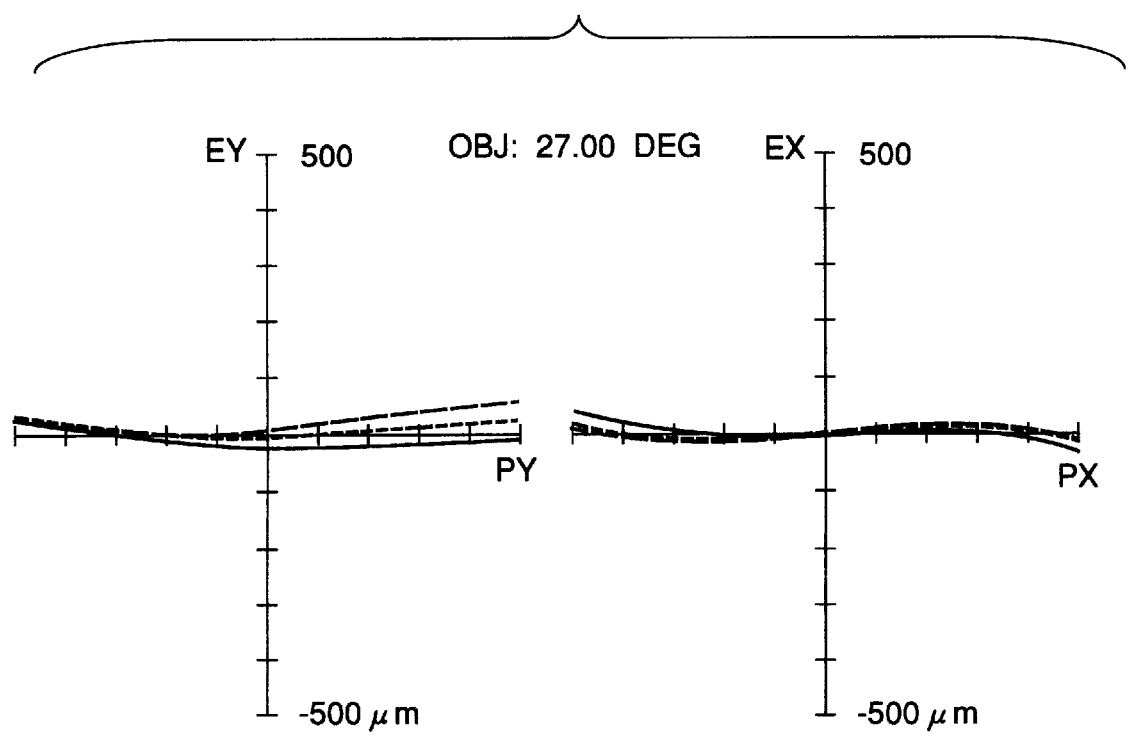
Figure 10C:
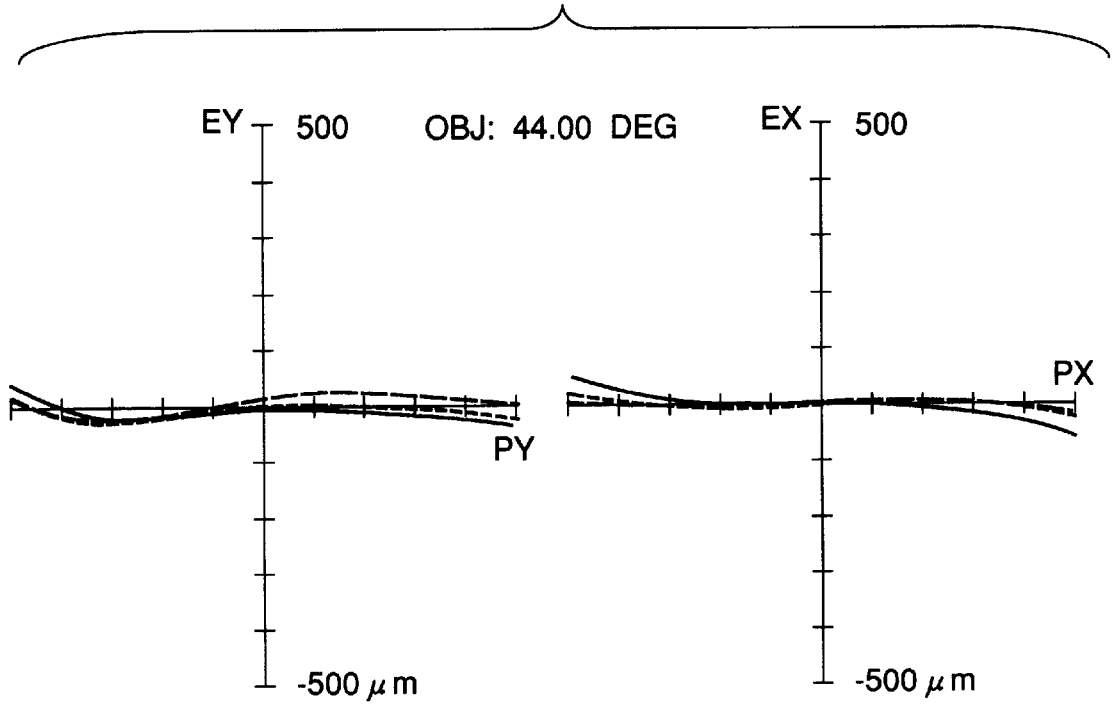
Figure 10D:
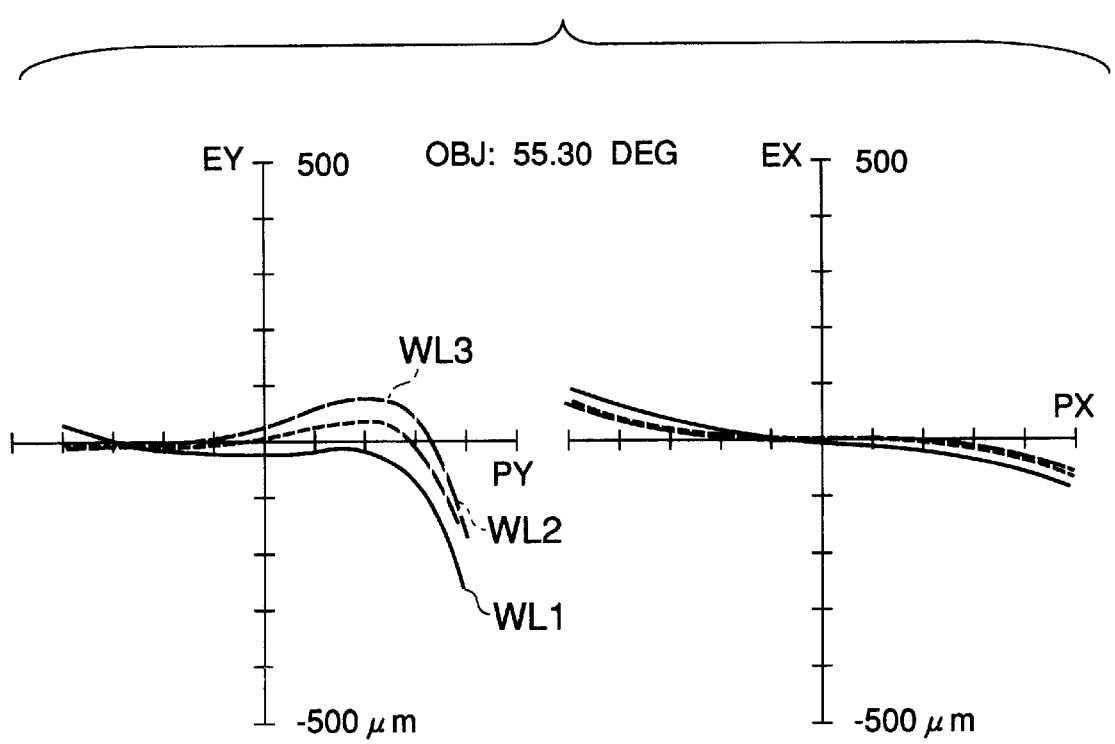
Figure 11A:
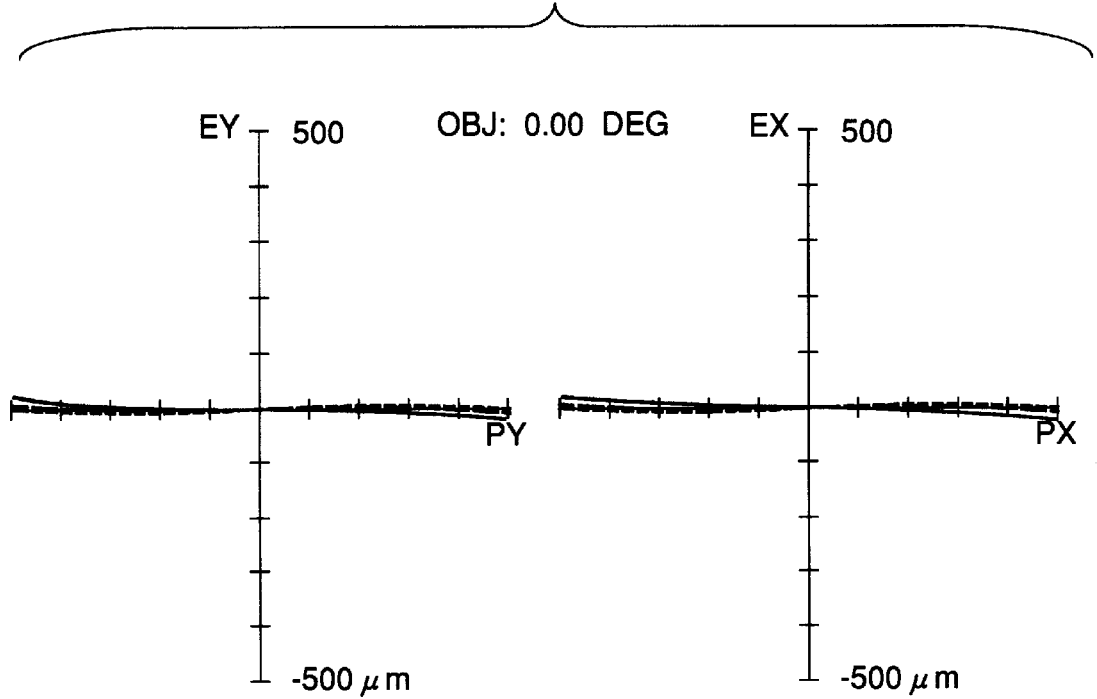
FIGS. 11A, 11B, 11C and 11D shows lateral aberrations of the ocular optical system according to the Embodiment 4.
Figure 11B:
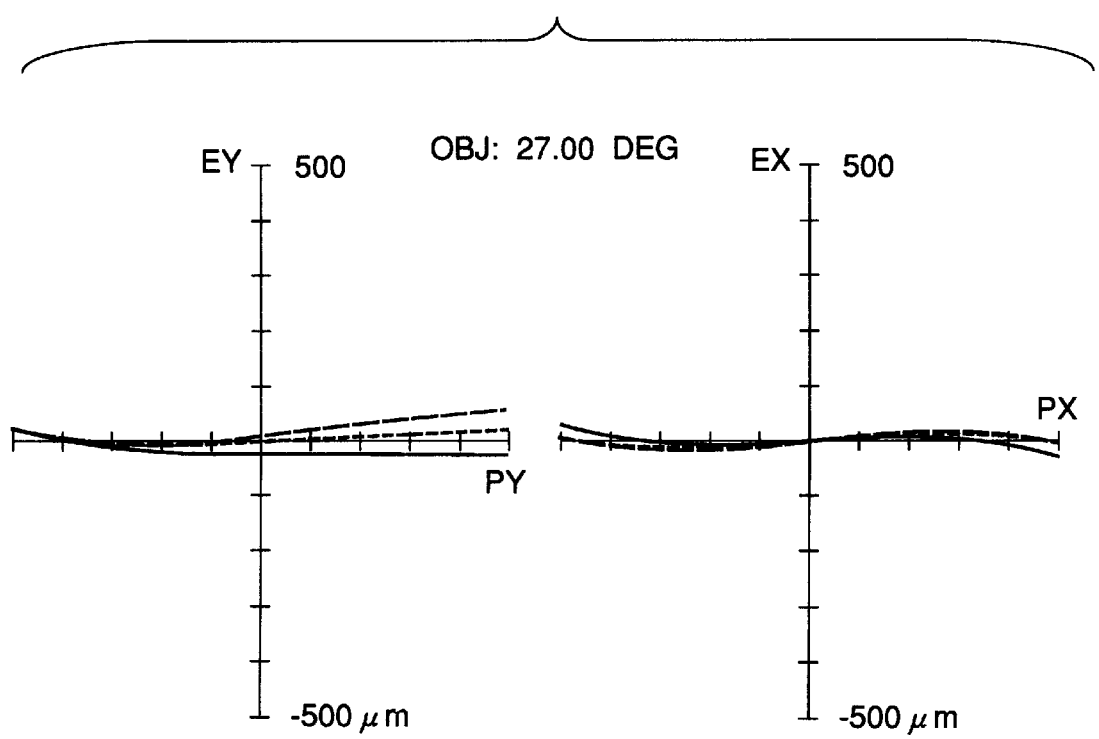
Figure 11C:
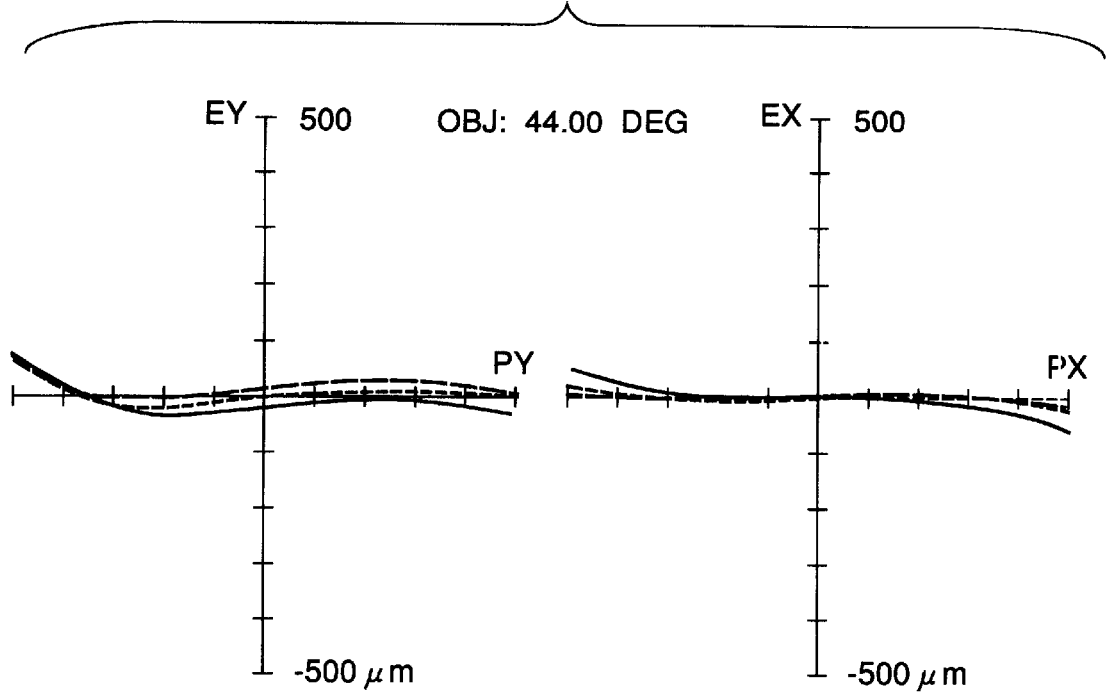
Figure 11D:
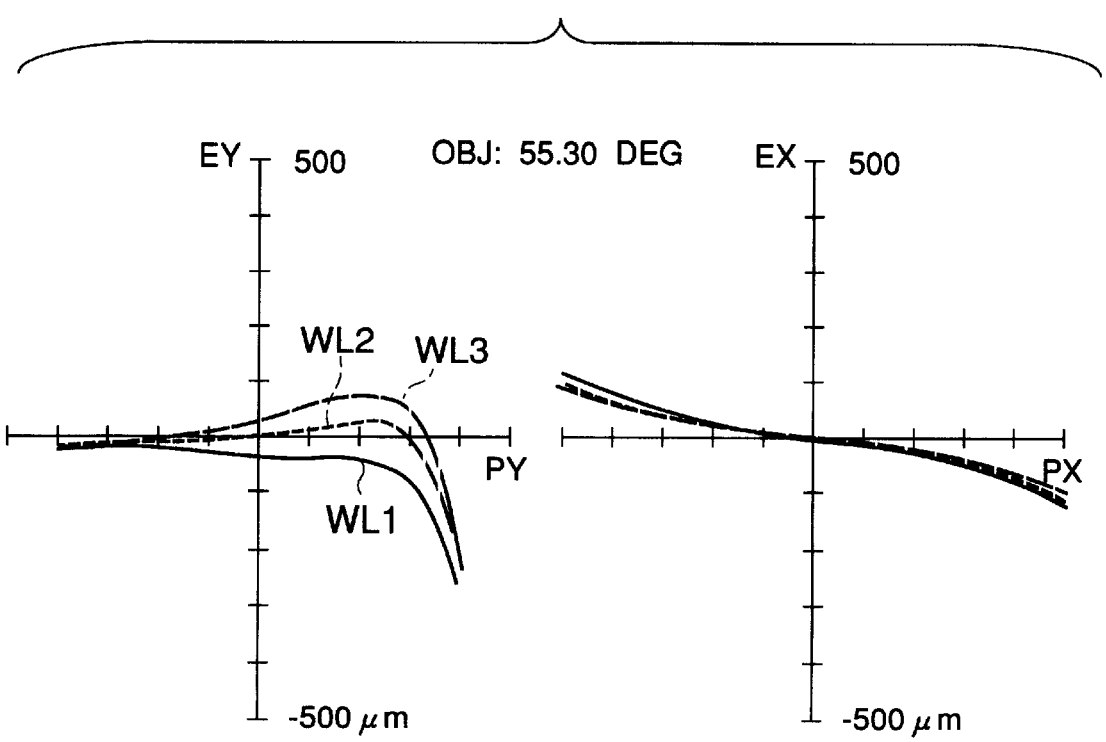
Figure 12A:
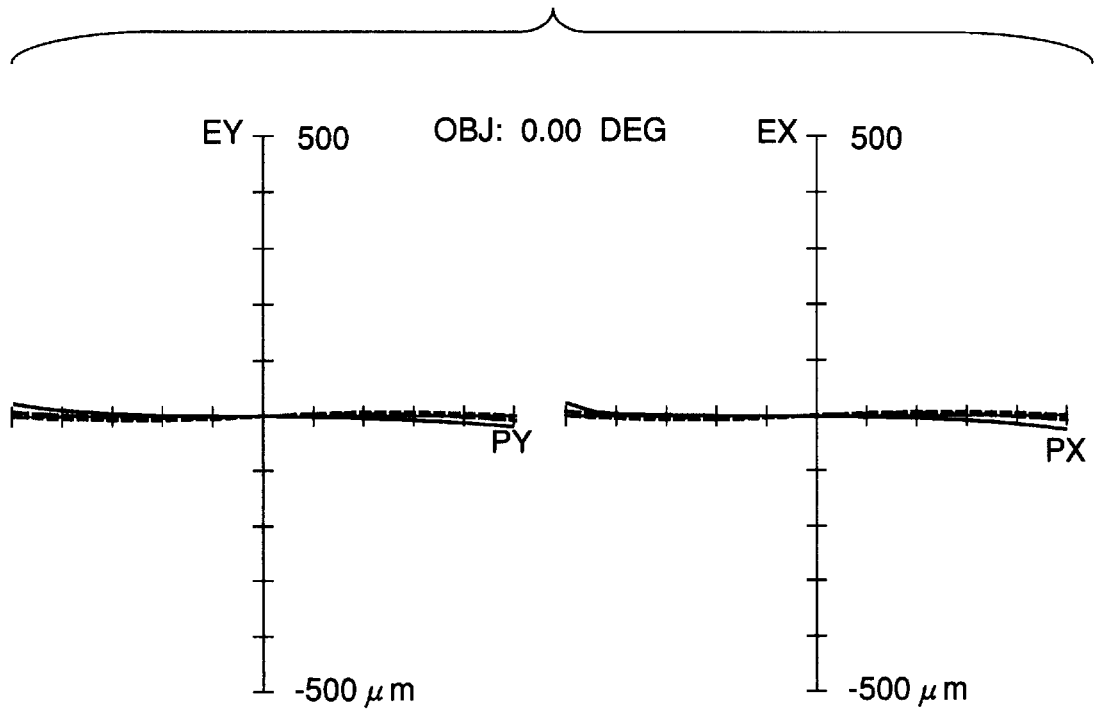
FIGS. 12A, 12B, 12C and 12D shows lateral aberrations of the ocular optical system according to the Embodiment 5.
Figure 12B:
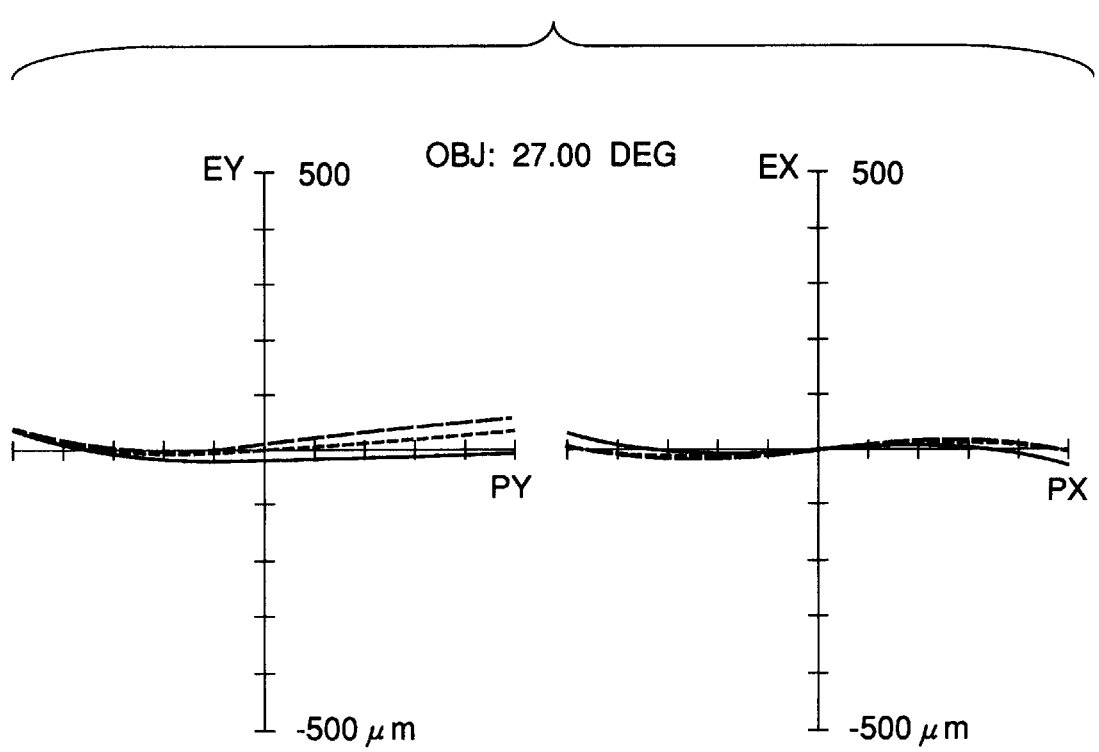
Figure 12C:
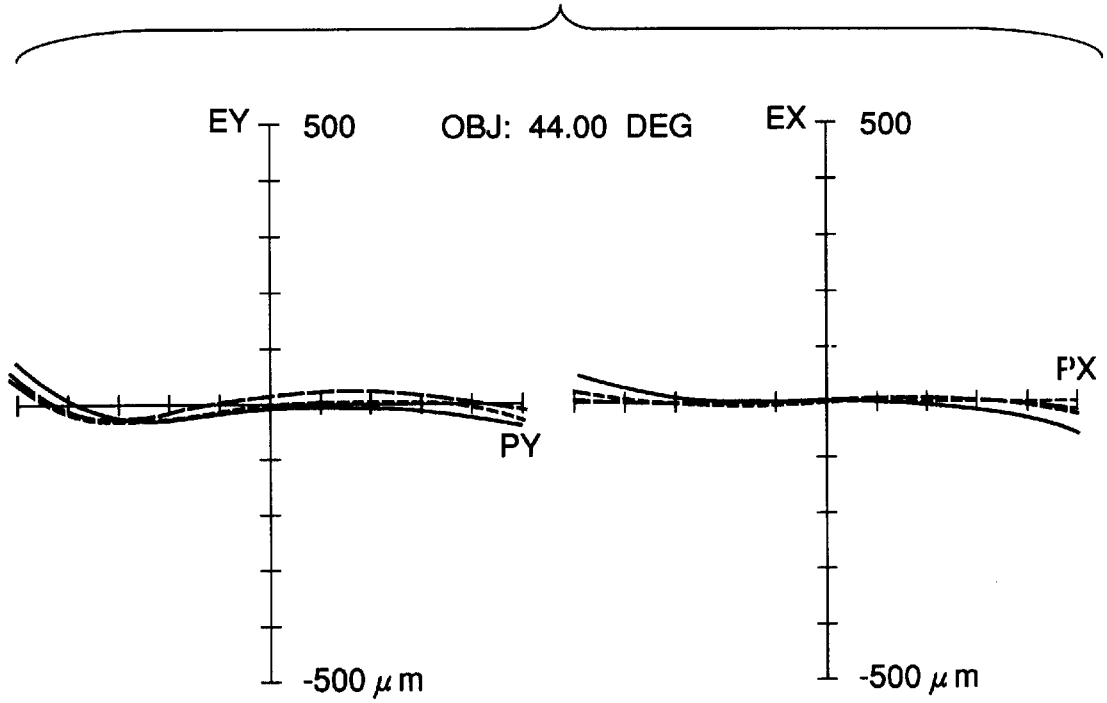
Figure 12D:
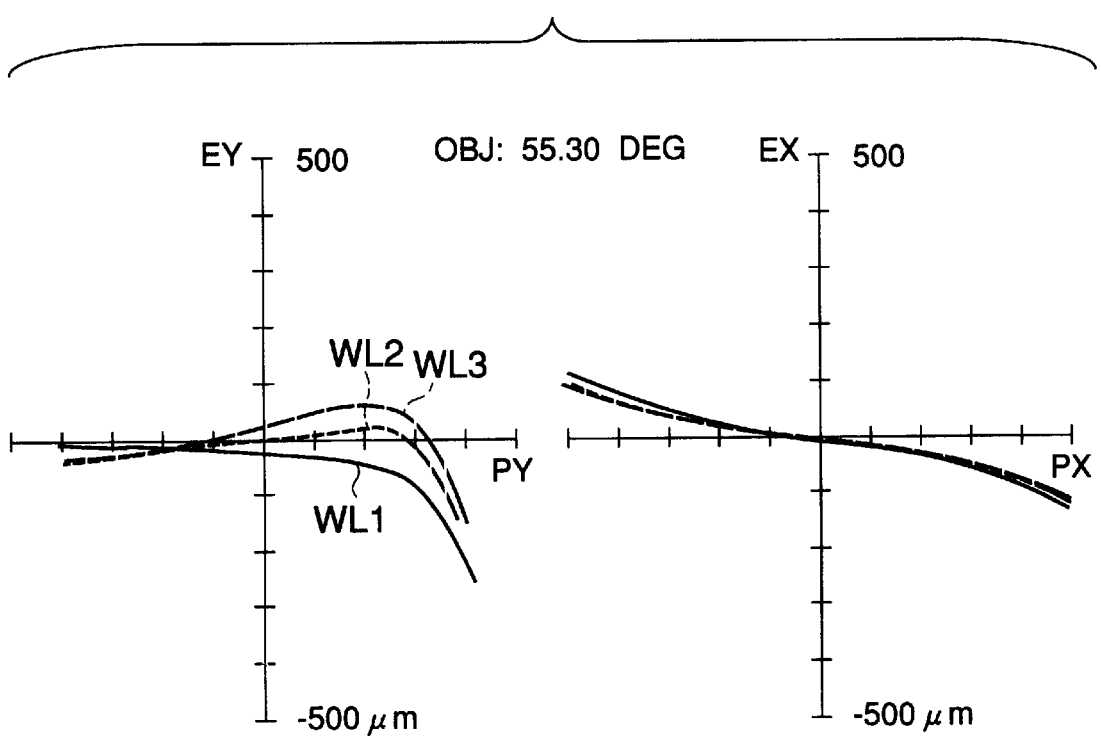
Figure 13A:
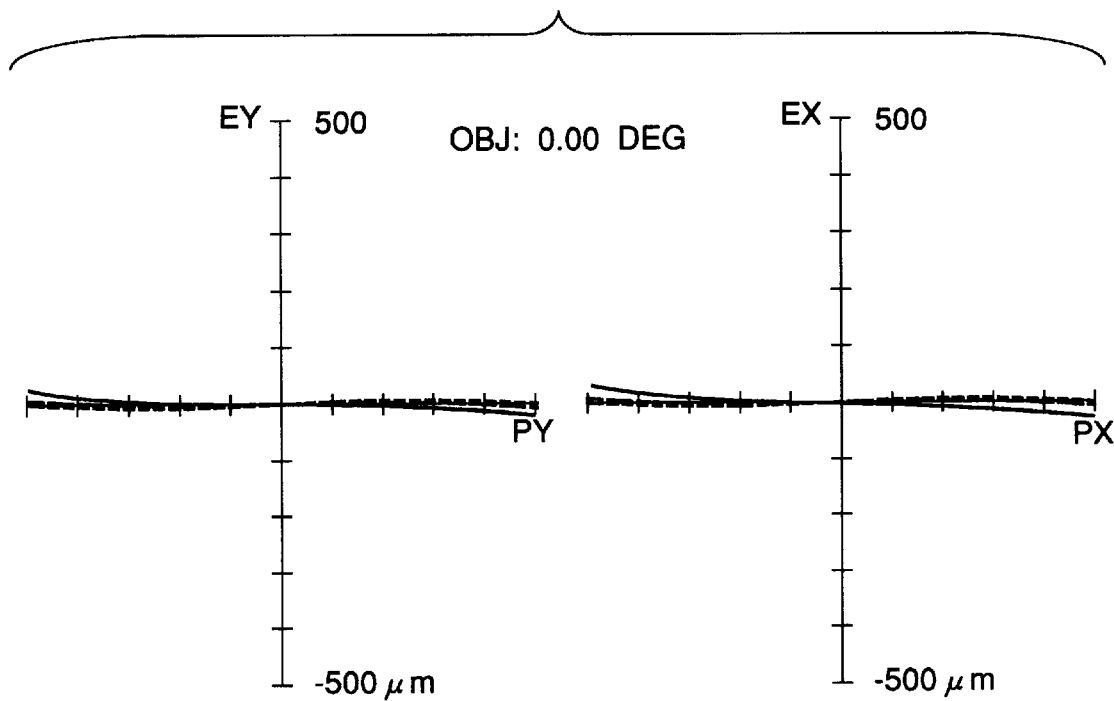
FIGS. 13A, 13B, 13C and 13D shows lateral aberrations of the ocular optical system according to the Embodiment 6.
Figure 13B:
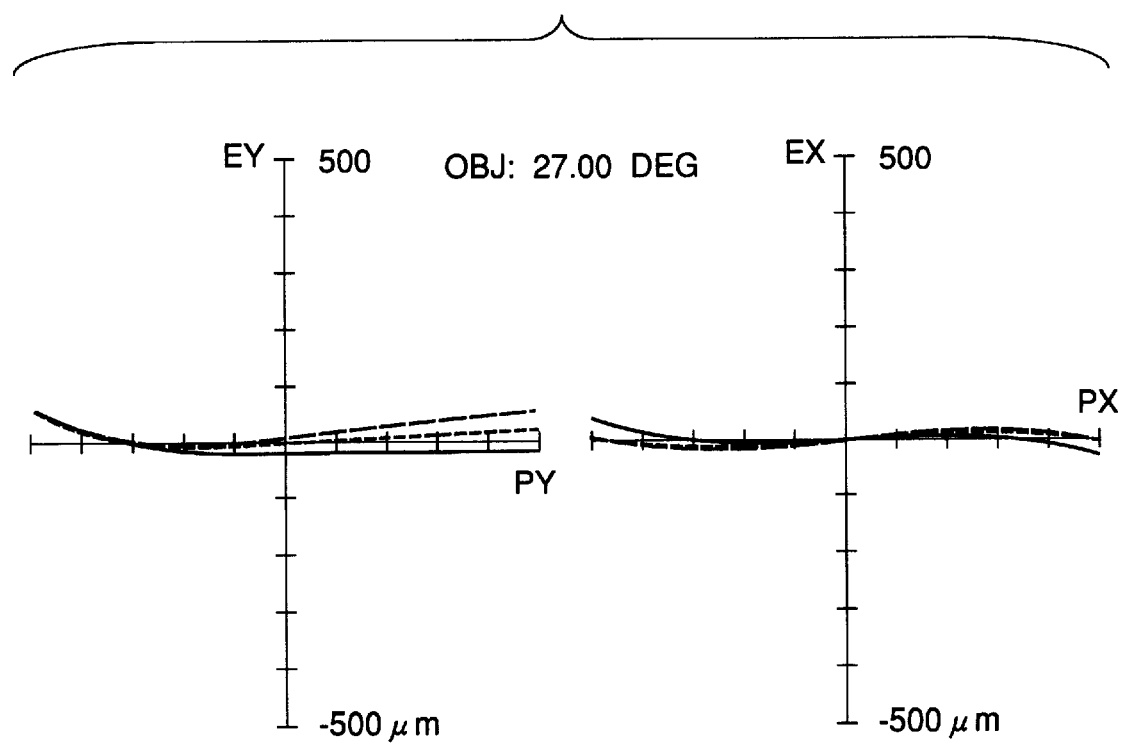
Figure 13C:
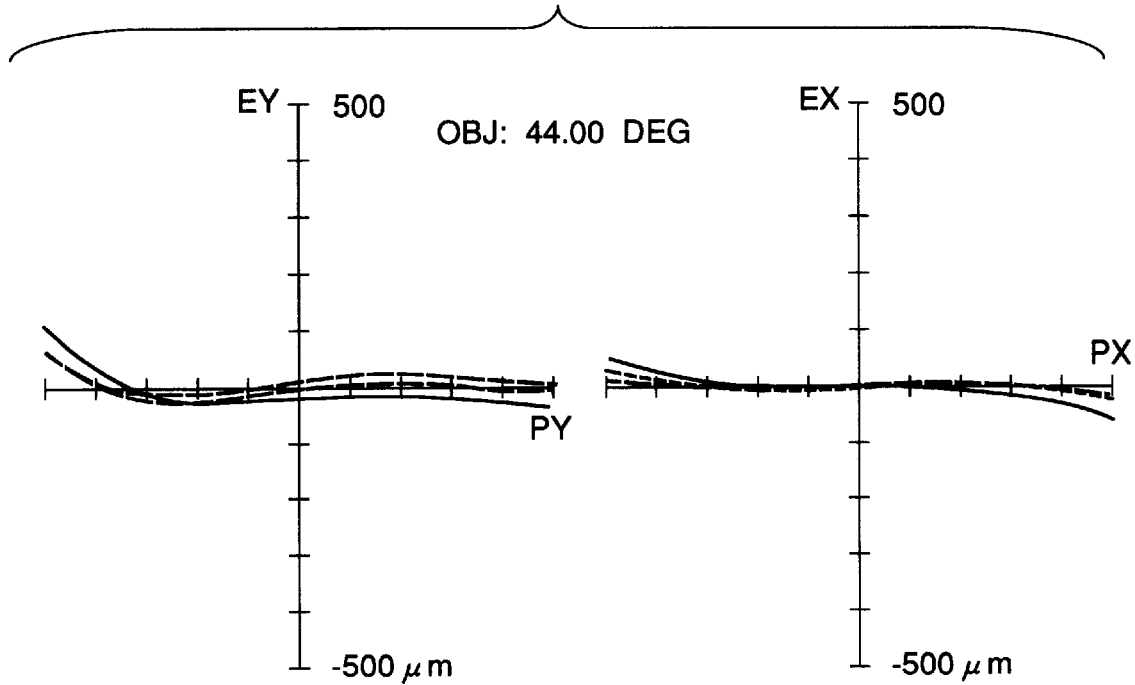
Figure 13D:
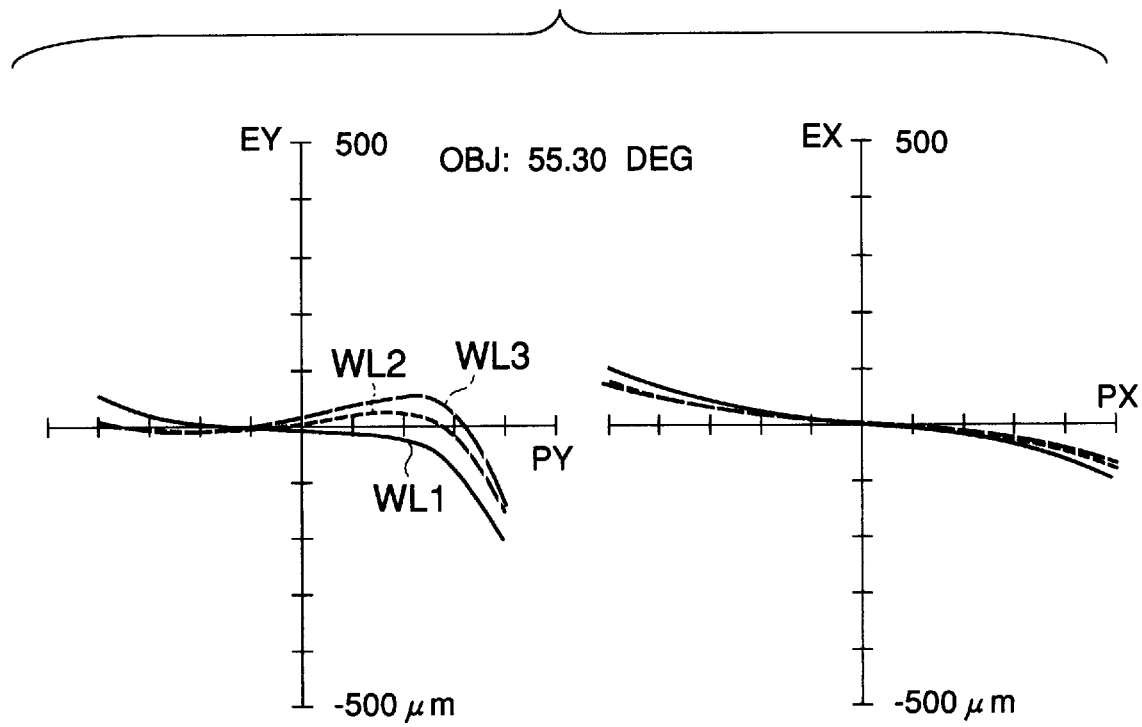
Figure 14A:
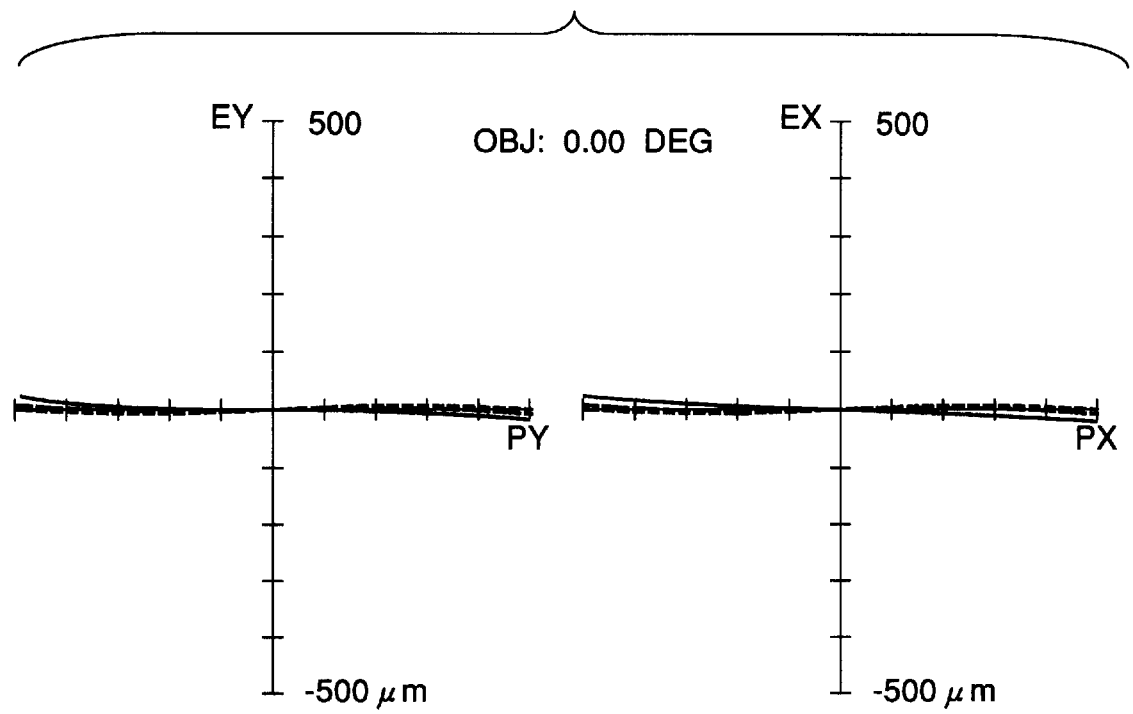
FIGS. 14A, 14B, 14C and 14D shows lateral aberrations of the ocular optical system according to the Embodiment 7.
Figure 14B:
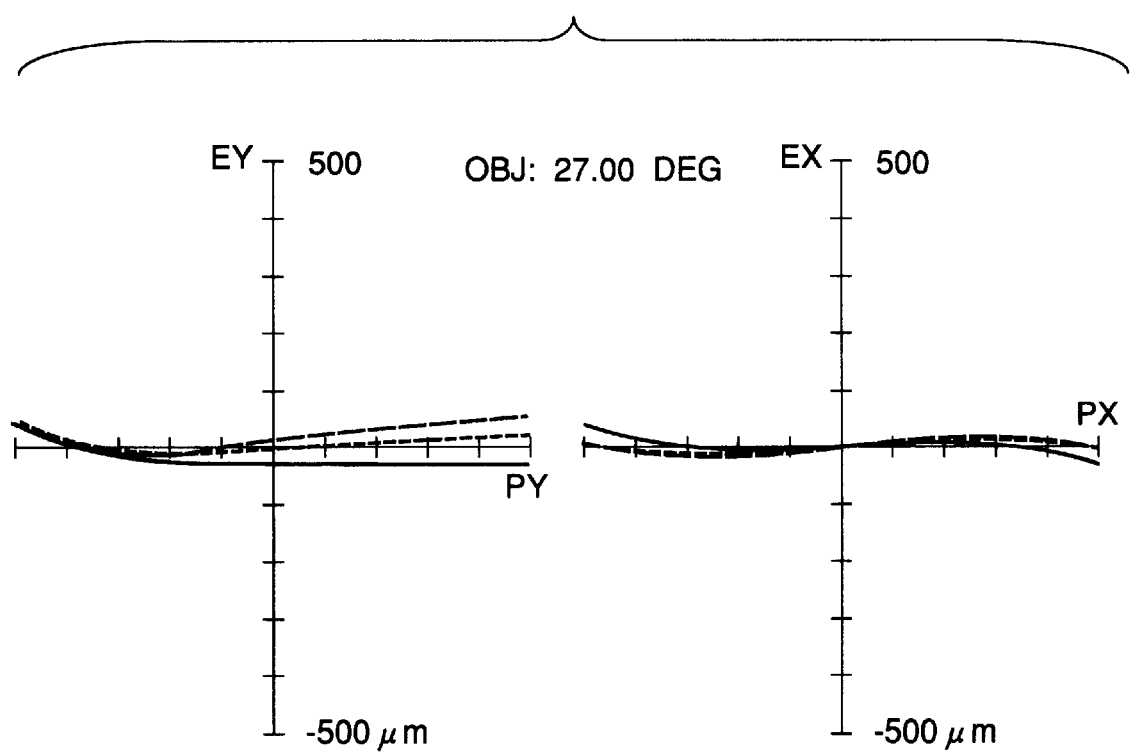
Figure 14C:
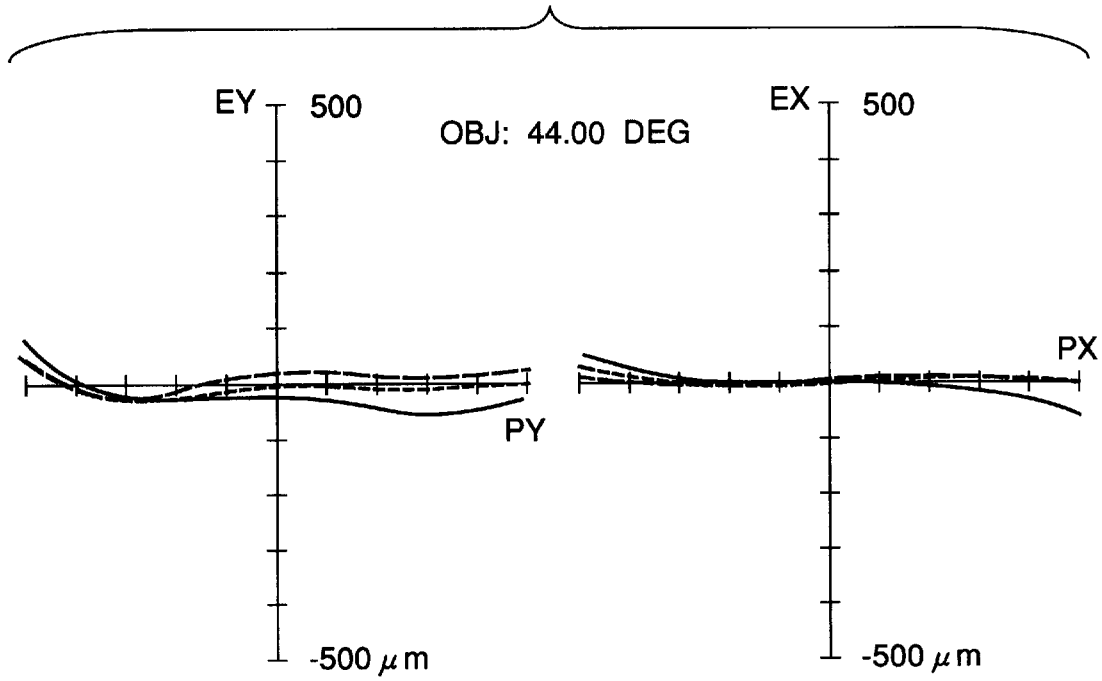
Figure 14D:
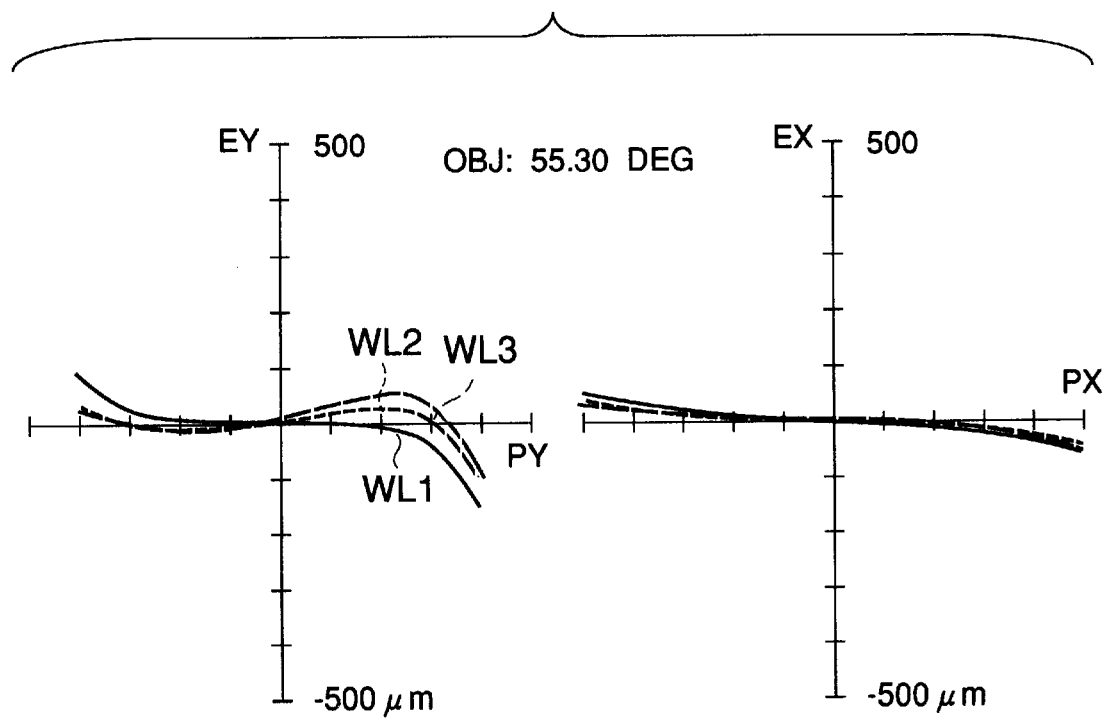

Since the cross sectional views shown in FIG. 1 to FIG. 7 would appear similar to each other, FIG. 1 illustrating the Embodiment 1 will be specifically described as a typical example. However, the same description can be applied to the Embodiments 2 to 7 (FIG. 2 to FIG. 7), respectively.

In FIG. 1, a reference numeral 1 represents an entrance pupil position of an ocular optical system 2 which corresponds to the pupil of eye of a viewer, a reference numeral 2 represents an ocular optical system according to the Embodiment 1 of the present invention, and a reference numeral 3 represents a small size two-dimensional display element such as an LCD, an ELD, an FED (field emission display) and a CRT (cathode ray tube).

The ocular optical system 2 has, in order from the eye (that is, in order from the entrance pupil 1), a positive first lens group $G_1$, a second lens group $G_2$, a third lens group $G_3$ and a positive fourth lens group $G_4$.

The first lens group $G_1$ comprises, in order from the entrance pupil 1, a meniscus first lens $L_1$ which has a concave surface directed toward the entrance pupil 1, and a positive meniscus second lens $L_2$ which has a concave surface, and has a positive refractive power. A concave surface of the first lens $L_1$ directed toward the second lens $L_2$ and the concave surface of the second lens $L_2$ have the same radius of curvature $r_3$ and are bonded to each other.

The first lens $L_1$ is made of high dispersion glass material while the second lens $L_2$ is made of low dispersion glass material. The first and second lenses $L_1$ and $L_2$ have Abbe numbers of $v_2$ and $v_3$, respectively, which preferably simultaneously satisfy the following inequalities to correct chromatic aberration favorably:

$$v_2 < 30 \quad (1)$$

$$v_3 > 35 \quad (2)$$

The second lens group $G_2$ comprises an aspherical third lens $L_3$ which has aspherical surfaces on both sides and has a negative power in the proximity of the center thereof (in other words, a negative on-axis refracting power). The third lens $L_3$ is constructed so that its peripheral region presents concave surfaces of large curvatures directed toward the entrance pupil 1 on both surfaces, thereby maintaining a low angle of incidence to peripheral rays having an increased inclination. Accordingly, as indicated later in Table 1, tenth order aspherical coefficients $A_{10}$ of both fifth and sixth surfaces assume negative values such that $$A_{10} < -1e^{-12} \quad (3)$$

The third lens group $G_3$ comprises an aspherical lens $L_4$ having aspherical surfaces on both sides and having a strong positive power in the proximity of the center thereof (in other words, a positive on-axis refracting power). The third lens $L_3$ is constructed so that its peripheral region presents concave surfaces of large curvatures directed toward the entrance pupil 1 on both sides, thereby maintaining a low angle of incidence to peripheral rays having an increased inclination. Accordingly, as indicated later in Table 1, eighth order aspherical coefficients $A_8$ of both seventh and eighth surfaces assume negative values such that $$A_8 < -1e^{-9} \quad (4)$$

The third lens $L_3$ is made of high dispersion glass material while the fourth lens $L_4$ is made of low dispersion glass material. The third and fourth lenses $L_3$ and $L_4$ have Abbe numbers of $v5$ and $v7$, respectively, which preferably simultaneously satisfy the following inequalities to correct chromatic aberration favorably:

$$v_5 < 30 \quad (5)$$

$$v_7 > 40 \quad (6)$$

The fourth lens group $G_4$ comprises a biconvex positive fifth lens $L_5$ and a biconcave negative sixth lens $L_6$ which are bonded to each other. A convex surface of the fifth lens $L_5$ directed toward the sixth lens $L_6$ and a concave surface of the sixth lens $L_6$ directed toward the fifth lens $L_5$ have the same radius of curvature $r_{10}$ and are bonded to each other. The sixth lens $L_6$ is made of glass material of a higher refractive power and a higher dispersion than glass material of the fifth lens $L_5$. The fifth and sixth lenses $L_5$ and $L_6$ have Abbe numbers of $v_9$ and $v_{10}$, respectively which preferably simultaneously satisfy the following inequalities to correct chromatic aberration favorably:

$$v_9 < 35 \quad (7)$$

$$v_{10} < 25 \quad (8)$$

Further, the ocular optical system of the Embodiment 1 satisfies the following inequalities simultaneously:

$$1.4 < f_1/f < 2.1 \quad (9)$$

$$3.8 < |f_2|/f < 5.4 \quad (10)$$

$$2.3 < f_3/f < 3.7 \quad (11)$$

$$5 < f_4/f < 450 \quad (12)$$

where $f_1$, $f_2$, $f_3$ and $f_4$ represent the on-axis focal lengths of the first to fourth lens groups $G_1$, $G_2$, $G_3$ and $G_4$, respectively, and f represents a focal length of the whole ocular optical system. The inequalities (9) to (12) define the nearaxis power distribution of the ocular optical system according to the present invention.

Further, the ocular optical system of the Embodiment 1 satisfies the following inequalities simultaneously:

$$1.1 < f_{12}/f_{34} < 2.4 \quad (13)$$

where the composite on-axis focal length of the first and second lens groups $G_1$ and $G_2$ and that of the lens groups $G_3$ and $G_4$ are represented by $f_{12}$ and $f_{34}$, respectively. Below the lower limit given in the inequality (13), a sufficient distance from the last surface of the fourth lens group $G_4$ to the screen 3 (back focal length) can not be attained. Above the upper limit given in the inequality (13), it becomes difficult to correct aberrations which occur in the third and fourth lens groups $G_3$ and $G_4$ for off-axis rays passing through regions near the outer periphery of the lenses, even though a sufficient distance to the screen is achieved.

Numeral data corresponding to the Embodiments 1 to 7 will be respectively given in Tables 1 to 7 below. The sectional views for these Embodiments 1 to 7 are shown in FIG. 1 to FIG. 7, respectively. Further, symbols appearing in Tables 1 to 7 are defined below.

EPD: a diameter [mm] of an entrance pupil (which is equal to an aperture diameter of an aperture stop AST)
F/#: F-number (for infinite conjugate)
f: a focal length [mm] of a whole ocular optical system
ω: a half angle [degree] of view on the entrance pupil side (for infinite conjugate)

m: the number of a surface as counted from the entrance pupil ri: a radius of curvature [mm] of an i-th surface as counted from the entrance pupil di: a distance [mm] from an i-th to an (i+1)-th surface as counted from the entrance pupil (thickness or air spacing [mm])

ni: a refractive index of a medium immediately following an i-th surface as counted from the entrance pupil with respect to a wavelength of 587.6 [nm](d-line)

vi: an Abbe number of medium immediately following an i-th surface as counted from the entrance pupil AST: an aperture stop surface (equivalent to the entrance pupil plane)

ASP: an aspherical surface

It is to be understood that various focal lengths, F-numbers and half angles of view given correspond to those obtained at the wavelength of 546 [nm]. The configuration of the aspherical surfaces indicated by ASP in Tables 1 to 7 are defined by equations (14) and (15) given below, $$Z = \frac{h^2/r}{1+[1-(1+K)\cdot(h/r)^2]^{1/2}} + A_4h^4 + A_6h^6 + A_8h^8 + A_{10}h^{10} \quad (14)$$

$$h^2 = X^2 + Y^2 \quad (15)$$

where r represents a radius of curvature at the center, K represents a conic constant, $A_4$, $A_6$, $A_8$ and $A_{10}$ represent fourth, sixth, eighth and tenth order aspherical coefficients, and h represents a height from an optical axis Z. It is assumed that the center of the aspherical surface is positioned at the origin of coordinate system (X, Y, Z) with the optical axis aligned with Z-direction.

TABLE 1

EPD = 6 mm
F/# = 3.39
f = 20.34 mm
ω = 55.3 deg

| m | ri | di | ni | vi | |
|---|---|---|---|---|---|
| 1 | Infinity | 10.39113 | | | AST |
| 2 | −208.7158 | 1.199669 | 1.84666 | 23.80 | |
| 3 | −118.2313 | 5.233134 | 1.88300 | 40.80 | |
| 4 | −26.51666 | 0.2989844 | | | |
| 5 | −75.38358 | 1.16401 | 1.92286 | 20.88 | ASP |
| 6 | −942.2735 | 0.2999439 | | | ASP |
| 7 | 355.1000 | 1.400586 | 1.81550 | 44.54 | ASP |
| 8 | −51.31939 | 0.2978106 | | | ASP |
| 9 | 29.42538 | 14.87237 | 1.88067 | 41.01 | |
| 10 | −49.11078 | 2.006771 | 1.95250 | 20.36 | |
| 11 | 24.54793 | | | | |

<Aspherical Coefficient>

| m | K | A4 | A6 | A8 | A10 |
|---|---|---|---|---|---|
| 5 | 3.441909 | −3.180804e−06 | 1.753093e−07 | −7.028220e−12 | −1.691404e−12 |
| 6 | −111184.3 | −1.827690e−05 | 5.589404e−08 | 2.608762e−10 | −1.370104e−12 |
| 7 | 290.0141 | 7.884213e−05 | 1.215767e−07 | −1.897368e−09 | 2.423454e−12 |
| 8 | −1.460662 | 1.203769e−04 | 3.057535e−08 | −1.494202e−09 | 1.690200e−12 |

TABLE 2

EPD = 6 mm
F/# = 3.43
f = 20.56 mm
ω = 55.3 deg

| m | ri | di | ni | vi | |
|---|---|---|---|---|---|
| 1 | Infinity | 9.979119 | | | AST |
| 2 | −152.34 | 1.186106 | 1.80518 | 25.40 | |
| 3 | −169.6303 | 5.560299 | 1.88300 | 40.80 | |
| 4 | −25.68688 | 0.2991265 | | | |
| 5 | −69.80249 | 1.216904 | 1.84666 | 23.78 | ASP |
| 6 | −924.489 | 0.299825 | | | ASP |
| 7 | 384.7175 | 1.199294 | 1.78831 | 47.47 | ASP |
| 8 | −54.64118 | 0.2981032 | | | ASP |
| 9 | 28.77296 | 15.89697 | 1.88300 | 40.80 | |
| 10 | −44.5963 | 1.253455 | 1.95250 | 20.36 | |
| 11 | 25.10315 | | | | |

TABLE 2-continued

<Aspherical Coefficient>

| m | K | A4 | A6 | A8 | A10 |
|---|---|---|---|---|---|
| 5 | 2.348008 | −2.909788e−06 | 1.792951e−07 | −6.443225e−12 | −1.759522e−12 |
| 6 | −103403 | −1.853932e−05 | 5.253922e−08 | 2.677245e−10 | −1.376774e−12 |
| 7 | 270.7032 | 8.009155e−05 | 1.285392e−07 | −1.897323e−09 | 2.457604e−12 |
| 8 | −0.9728348 | 1.226507e−04 | 2.409810e−08 | −1.445618e−09 | 1.652577e−12 |

TABLE 3

EPD = 6 mm
F/# = 3.60
f = 21.62 mm
ω = 55.3 deg

| m | ri | di | ni | vi | |
|---|---|---|---|---|---|
| 1 | Infinity | 10 | | | AST |
| 2 | −83.3874 | 1.178085 | 1.80518 | 25.46 | |
| 3 | −101.5613 | 4.911443 | 1.83481 | 42.70 | |
| 4 | −24.50339 | 0.1973921 | | | |
| 5 | −71.52993 | 1.415256 | 1.80518 | 25.46 | ASP |
| 6 | −1072.932 | 0.1991061 | | | ASP |
| 7 | 576.4792 | 1.495441 | 1.80400 | 46.60 | ASP |
| 8 | −51.74215 | 0.1961301 | | | ASP |
| 9 | 30.16041 | 16.39692 | 1.88067 | 41.01 | |
| 10 | −45.23118 | 1.446452 | 1.92286 | 20.88 | |
| 11 | 28.08398 | | | | |

<Aspherical Coefficient>

| m | K | A4 | A6 | A8 | A10 |
|---|---|---|---|---|---|
| 5 | −13.34598 | −4.708608e−06 | 1.306524e−07 | 6.222581e−11 | −1.615528e−12 |
| 6 | −414339.1 | −2.340399e−05 | 6.35461e−08 | 2.807194e−10 | −1.45533e−12 |
| 7 | 548.5979 | 4.669699e−05 | 1.637019e−07 | −2.126294e−09 | 3.262974e−12 |
| 8 | −3.475104 | 8.52946e−05 | 4.682498e−08 | −1.650631e−09 | 2.153772e−12 |

TABLE 4

EPD = 6 mm
F/# = 3.58
f = 21.19 mm
ω = 55.3 deg

| m | ri | di | ni | vi | |
|---|---|---|---|---|---|
| 1 | Infinity | 10 | | | AST |
| 2 | −66.38709 | 1.181056 | 1.84666 | 23.78 | |
| 3 | −87.12748 | 4.872591 | 1.88067 | 41.01 | |
| 4 | −23.58734 | 0.1997949 | | | |
| 5 | −81.32221 | 1.2532 | 1.84666 | 23.83 | ASP |
| 6 | −1026.751 | 0.1964757 | | | ASP |
| 7 | 499.0782 | 1.29165 | 1.81600 | 46.57 | ASP |
| 8 | −62.94417 | 0.1969382 | | | ASP |
| 9 | 28.96059 | 16.88361 | 1.88300 | 40.80 | |
| 10 | −44.28579 | 1.260425 | 1.92286 | 20.88 | |
| 11 | 27.88903 | | | | |

TABLE 4-continued

<Aspherical Coefficient>

| m | K | A4 | A6 | A8 | A10 |
|---|---|----|----|----|-----|
| 5 | −23.67701 | −4.2937e−06 | 1.188588e−07 | 6.350464e−11 | −1.612995e−12 |
| 6 | −348761.3 | −2.130919e−05 | 6.640323e−08 | 2.901398e−10 | −1.584292e−12 |
| 7 | 612.7471 | 5.684473e−05 | 1.589315e−07 | −1.886907e−09 | 2.727891e−12 |
| 8 | −3.123111 | 9.579332e−05 | 5.536085e−08 | −1.591694e−09 | 2.295459e−12 |

TABLE 5

EPD = 6 mm
F/# = 3.54
f = 21.22 mm
ω = 55.3 deg

| m | ri | di | ni | vi | |
|---|-----|----|----|----|---|
| 1 | Infinity | 10 | | | AST |
| 2 | −74.88661 | 1.182315 | 1.80518 | 25.39 | |
| 3 | −77.47562 | 4.438144 | 1.88067 | 41.01 | |
| 4 | −24.25599 | 0.1969599 | | | |
| 5 | −71.73665 | 1.340749 | 1.80810 | 22.80 | ASP |
| 6 | −911.716 | 0.198743 | | | ASP |
| 7 | 494.8345 | 1.242744 | 1.81550 | 44.54 | ASP |
| 8 | −61.62204 | 0.1995371 | | | ASP |
| 9 | 28.47602 | 17.35285 | 1.88067 | 41.01 | |
| 10 | −41.16908 | 1.199999 | 1.95250 | 20.36 | |
| 11 | 28.71935 | | | | |

<Aspherical Coefficient>

| m | K | A4 | A6 | A8 | A10 |
|---|---|----|----|----|-----|
| 5 | −24.30437 | −3.937811e−06 | 1.396362e−07 | 6.271357e−11 | −1.703654e−12 |
| 6 | −247994.8 | −2.10953e−05 | 7.343356e−08 | 2.774891e−10 | −1.528556e−12 |
| 7 | 584.9283 | 6.549401e−05 | 1.442423e−07 | −1.756133e−09 | 2.392617e−12 |
| 8 | −2.859731 | 1.057710e−04 | 4.927167e−08 | −1.481119e−09 | 1.950970e−12 |

TABLE 6

EPD = 6 mm
F/# = 3.49
f = 20.95 mm
ω = 55.3 deg

| m | ri | di | ni | vi | |
|---|-----|----|----|----|---|
| 1 | Infinity | 10 | | | AST |
| 2 | −69.27763 | 1.188851 | 1.92286 | 20.88 | |
| 3 | −59.59411 | 3.955724 | 1.88067 | 41.01 | |
| 4 | −23.60138 | 0.1981361 | | | |
| 5 | −73.12881 | 1.280791 | 1.84666 | 23.78 | ASP |
| 6 | −691.7899 | 0.1960733 | | | ASP |
| 7 | 480.5761 | 1.194867 | 1.81550 | 44.54 | ASP |
| 8 | −60.30821 | 0.1996047 | | | ASP |
| 9 | 28.10611 | 17.35652 | 1.88300 | 40.80 | |
| 10 | −39.59935 | 1.199856 | 1.95250 | 20.36 | |
| 11 | 27.94164 | | | | |

TABLE 6-continued

<Aspherical Coefficient>

| m | K | A4 | A6 | A8 | A10 |
|---|---|---|---|---|---|
| 5 | −22.94933 | −3.181612e−06 | 1.436829e−07 | 6.76d054e−11 | −1.757522e−12 |
| 6 | −86199.07 | −2.050519e−05 | 7.390002e−08 | 2.790334e−10 | −1.571828e−12 |
| 7 | 560.7989 | 6.699492e−05 | 1.447558e−07 | −1.76436e−09 | 2.430195e−12 |
| 8 | −2.934674 | 1.079733e−04 | 4.937931e−08 | −1.469864e−09 | 1.946469e−12 |

TABLE 7

EPD = 6 mm
F/# = 3.41
f = 20.45 mm
ω = 55.3 deg

| m | ri | di | ni | vi | |
|---|---|---|---|---|---|
| 1 | Infinity | 10 | | | AST |
| 2 | −64.76193 | 1.186534 | 1.805180 | 25.46 | |
| 3 | −61.66312 | 4.361967 | 1.880670 | 41.01 | |
| 4 | −22.71209 | 0.199997 | | | |
| 5 | −72.45874 | 1.293703 | 1.846660 | 23.78 | ASP |
| 6 | −562.8489 | 0.1978953 | | | ASP |
| 7 | 555.9298 | 1.204427 | 1.794997 | 45.30 | ASP |
| 3 | −53.52755 | 0.1983603 | | | ASP |
| 9 | 29.13636 | 17.24395 | 1.880670 | 41.01 | |
| 10 | −38.49217 | 1.343959 | 1.922860 | 20.88 | |
| 11 | 25.87751 | | | | |

<Aspherical Coefficient>

| m | K | A4 | A6 | A8 | A10 |
|---|---|---|---|---|---|
| 5 | −24.80971 | −2.444776e−06 | 1.534418e−07 | 7.518636e−11 | −1.644966e−12 |
| 6 | −58806.52 | −1.845493e−05 | 7.318167e−08 | 2.750231e−10 | −1.449131e−12 |
| 7 | 395.4237 | 6.617951e−05 | 1.346359e−07 | −1.791717e−09 | 2.553931e−12 |
| 8 | −2.440146 | 1.049226e−04 | 4.778825e−08 | −1.434276e−09 | 1.904723e−12 |

Focal lengths of various parts of the lens system in ious numeral data in Tables 1 to 7 as well as ratios of these al lengths are summarized in Table 8 given below:

TABLE 8

| EMBODIMENT | f | f1 | f2 | f3 | f4 | f12 | f34 | f1/f | \|f2\|/f | f3/f | f4/f | f12/f34 |
|---|---|---|---|---|---|---|---|---|---|---|---|---|
| 1 | 20.3 | 33.8 | −87.9 | 54.8 | 8084 | 55.1 | 40 | 1.66 | 4.32 | 2.69 | 397.4 | 1.38 |
| 2 | 20.6 | 33.9 | −88.4 | 60.5 | 517 | 55.4 | 40.9 | 1.65 | 4.30 | 2.94 | 25.1 | 1.36 |
| 3 | 21.6 | 39.4 | −94.4 | 58.8 | 220 | 69.1 | 37 | 1.82 | 4.36 | 2.72 | 10.2 | 1.87 |
| 4 | 21.2 | 38.6 | −103.4 | 68.2 | 159 | 63.1 | 38.8 | 1.82 | 4.88 | 3.22 | 7.5 | 1.62 |
| 5 | 21.2 | 38.5 | −95.4 | 66.9 | 156 | 65.9 | 37.7 | 1.81 | 4.50 | 3.15 | 7.3 | 1.75 |
| 6 | 21.0 | 38.2 | −95.7 | 65.4 | 168 | 65.0 | 37.5 | 1.82 | 4.57 | 3.12 | 8.0 | 1.73 |
| 7 | 20.5 | 37.3 | −97.4 | 61.2 | 237 | 61.9 | 37.7 | 1.82 | 4.76 | 2.99 | 11.6 | 1.64 | where symbols used are defined below.
f: a focal length [mm] of the whole ocular optical system
$f_1$: a focal length [mm] of the first lens group $G_1$
$f_2$: an on-axis focal length [mm] of the second lens group $G_2$
$f_3$: an on-axis focal length [mm] of the third lens group $G_3$
$f_4$: a focal length [mm] of the fourth lens group $G_4$
$f_{12}$: a composite on-axis focal length [mm] of the first and second lens groups $G_1$ and $G_2$
$f_{34}$: a composite on-axis focal length [mm] of the third and fourth lens groups $G_3$ and $G_4$ It is to be noted that values given for the focal lengths are for the wavelength of 546 [nm].

FIGS. 8A, 8B, 8C and 8D to FIGS. 14A, 14B, 14C and 14D show lateral aberrations of the Embodiments 1 to 7 corresponding to the numeral data in Table 1 to 7. In these figures, EY represents aberrations in the meridional plane while EX represents aberrations in the saggital plane. $WL_1$, $WL_2$ and $WL_3$ show curves corresponding to wave lengths of 470 [nm], 546 [nm] and 610 [nm], respectively. Further, lateral aberrations on a surface of on the image display element 3 on a small conjugate side are illustrated for four values of the angle of incidence (incidence from infinite distance). It is seen from FIGS. 8A, 8B, 8C and 8D to FIGS. 14A, 14B, 14C and 14D that lateral aberrations as well as chromatic aberration are favorably corrected in each of the Embodiments 1 to 7, and that an enlarged virtual image can be formed at a wide angle of view equal to or greater than 110° in the diagonal direction at a high resolution.

As mentioned above, the ocular optical system 2 according to the Embodiments 1 to 7 can present a large angle of view equal to or greater than 100° for a single eye, provides a freedom of pupil position which is enabled by an appropriate pupil diameter and eye relief, and presents a sharp and flat image up to the periphery as a result of the correction of aberrations.

Embodiment 8

Next, an ocular image display apparatus incorporating the ocular optical system of any one of the Embodiments 1 to 7 will be described with reference to FIG. 15.

Figure 15:
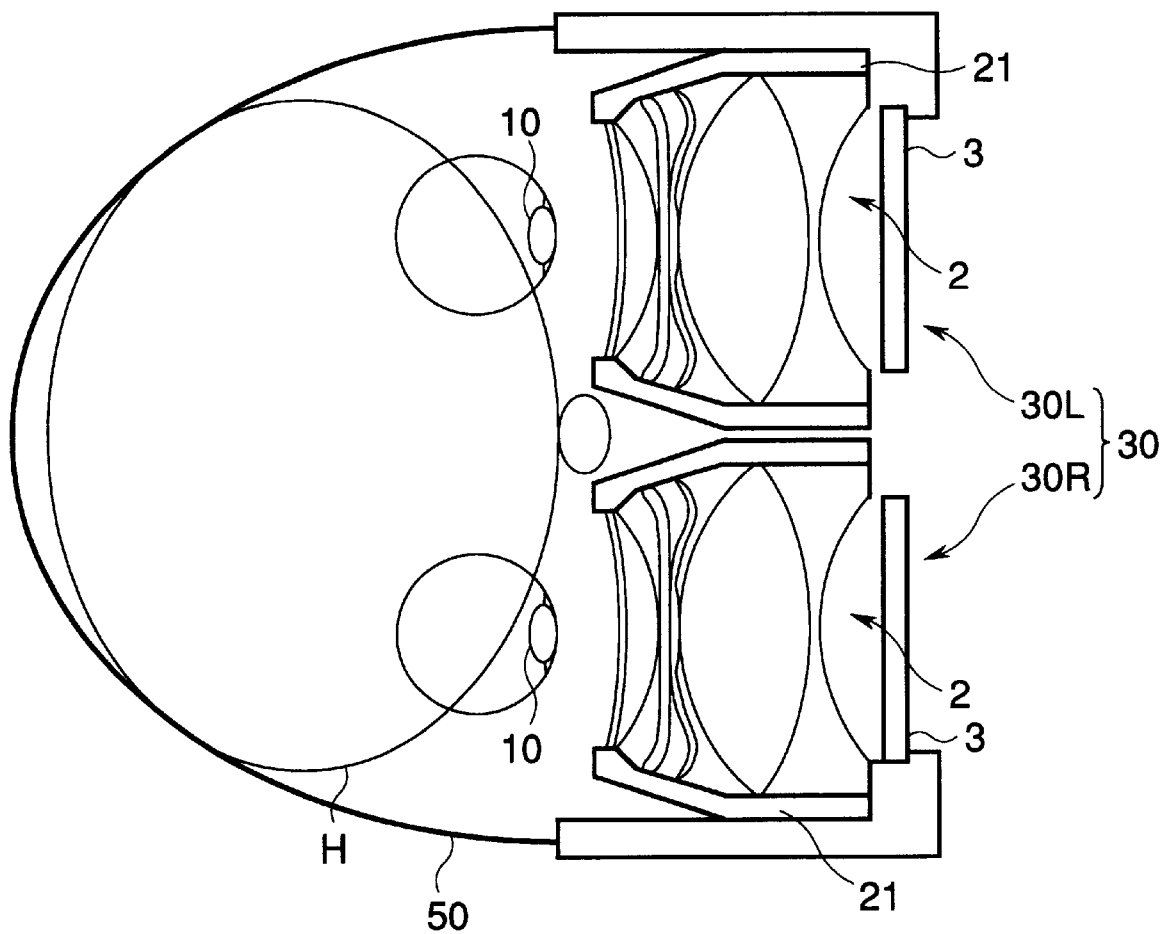
FIG. 15 is a schematic diagram showing an ocular image display apparatus according to an Embodiment 8 of the present invention.
Figure 16:
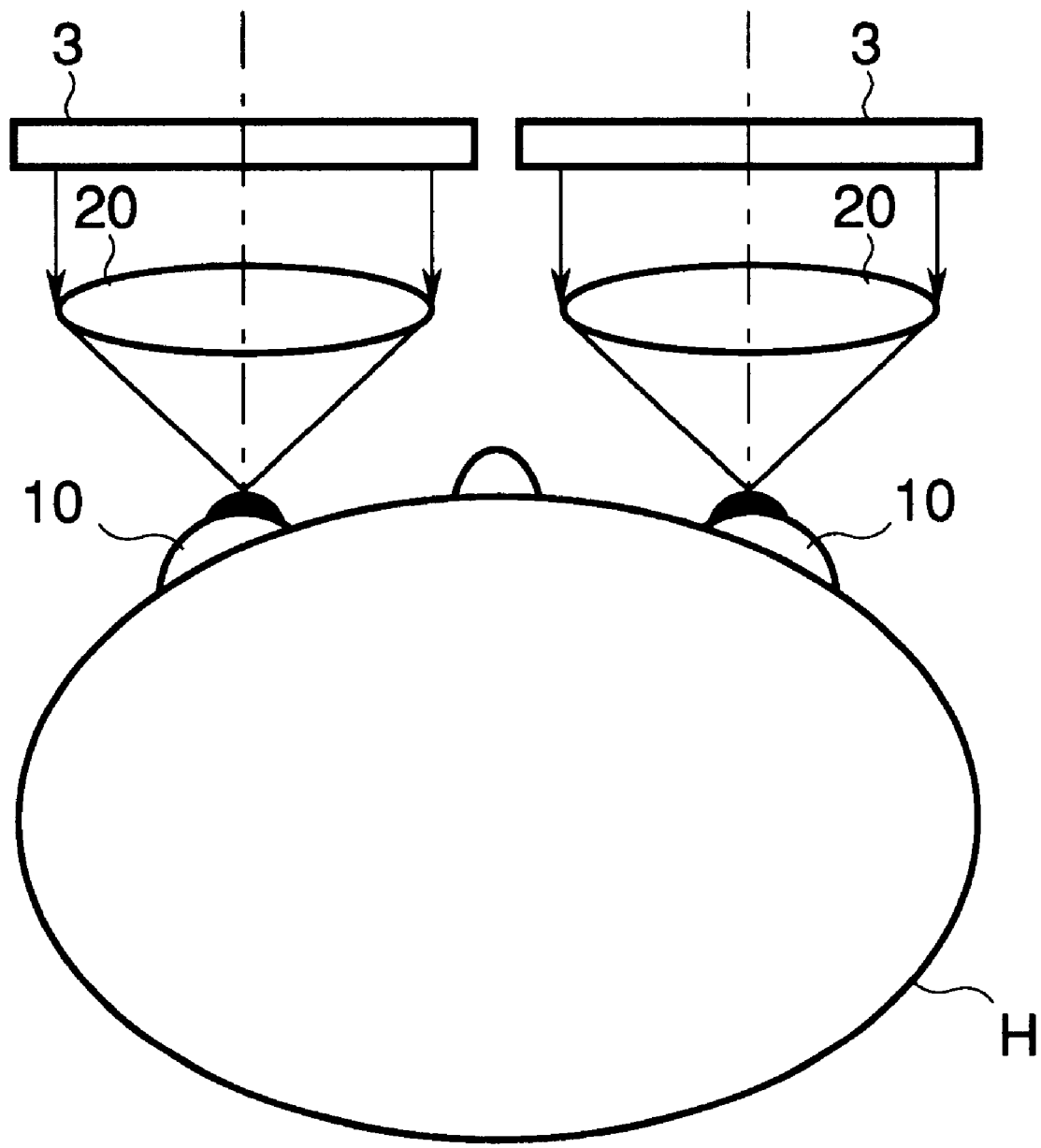
FIG. 16 is a schematic diagram showing a conventional ocular image display apparatus.

Referring to FIG. 15, the ocular image display apparatus 30 includes a left and a right display unit 30 L and 30R for left and right eyes 10, and a belt mechanism 50 for fixing the left and right display units 30L and 30R to a head of a viewer H. Each of the display units 30L and 30R includes an ocular optical assembly 21 and a display element 3 for displaying an original image. Each of the ocula r optical assemblies 21 includes an ocular optical system 2 described in the Embodiments 1 to 7, and the supporting member for supporting the ocular optical system. The two-dimensional display elements 3 may comprise LCDs, ELDs, FEDs or CRTs as described in the conventional apparatus of FIG. 16. Where the LCDs are employed, light sources (not shown) such as fluorescent lamps, LEDs and ELs are assembled into the display elements 3, because the LCDs are not spontaneous light emission elements. The use of such light sources can be dispensed, when the two-dimensional display elements are spontaneous light emission elements such as ELDs, FEDs and CRTs.

Original images formed on the image displaying planes of the two-dimensional display elements 3 are converted into a magnified virtual image by the ocular optical systems 2, and the magnified virtual images can be viewed by the eyes 10 of the viewer H. Since the ocular image display apparatus 30 to be placed in front of the eyes 10 incorporates the ocular optical system 2 mentioned above, it is capable of presenting a large angle of view equal to or greater than 100°, providing a freedom of the pupil position by virtue of an appropriate pupil diameter and an eye relief, and presenting a sharp and flat viewable image even at the periphery. This result in a sharp picture display at a wide angle of view and an excellent viewer's feeling as if he is within the scene.

In the Embodiment 8, even when images presented to left and right eyes 10 are superimposed upon each other completely, a sufficient large full angle of view which is equal to or greater than 100° can be obtained, because the ocular optical system 2 in the Embodiments 1 to 7 presents a sufficient large full angle of view equal to or greater than 100°. However, if the images presented to the respective eyes are displaced horizontally outward according to a known technique, the angle of view in the horizontal direction can be further increased. Therefore, it may be desirable that:

(a) the center of the display element 3 be shifted horizontally with respect to the optical axis of the ocular optical system 2 to move the virtual image in the horizontal direction; or (b) the entire display units (30L and 30R) each comprising a combination of the optical assembly 20 and the two-dimensional display element 3 be disposed at an angle in each horizontal plane to cause an apparent shift of the position where the virtual image is formed, thus shifting the images formed for the left and the right eye laterally outward.

In the Embodiment 8, an excellent result in respect of the viewer's feeling of his presence within the scene can be achieved if the same image is displayed on the both two-dimensional display elements 3 under the condition that the magnified images for both eyes 10 are superimposed upon each other completely, owing to the fact that the image displayed has a sufficiently large angle of view. In either instance in which the left and the right magnified image are completely superimposed upon each other or in which these magnified images are shifted horizontally outward before the superimposition, the viewer's feeling of his presence within the scene can be further enhanced by the stereoscopic vision effect which is brought forth by displaying images which contain parallax between the both eyes on the left and the right two-dimensional display elements.

In actual implementation, the optical assembly 21 and the two-dimensional display element 3 are integrally assembled together into the display unit 30L or 30R, and the both display units 30L and 30R are fixedly mounted on the head of the viewer H by the belt mechanism 50. However, the use of the belt mechanism 50 is not essential when the both display units 30L and 30R are contained in a common housing to form an ocular image display apparatus 30 which may be peeped into. The distance between the optical assembly 21 and the two-dimensional display element 3 in the direction of the optical axis as well as the distance between the display units 30L and 30R may be suitably adjusted in accordance with the eye characteristics and an interval between the pupils of the viewer H, and thus can be optimized for each viewer. While the ocular image display apparatus 30 in FIG. 15 has two sets of optical assemblies 21 and display elements 3 for binocular vision, it is possible in a modification to utilize a single set for monocular vision.

As mentioned above, the ocular image display apparatus according to the Embodiment 8 is capable of achieving a compact size and light weight, and presenting a sharp picture display with a wide angle of view and with an excellent viewer's feeling of his presence within the scene.

What is claimed is:

1. An ocular optical system to be placed in front of a human eye for forming a magnified virtual image of an original image displayed on a two-dimensional display means, comprising, in order from the eye:

a positive first lens group including, in order from the eye, a meniscus first lens which has a concave surface directed toward the eye and a positive meniscus second lens which has a concave surface, a convex surface of said first lens directed toward said second lens and said concave surface of said second lens having the same radius of curvature and being bonded to each other;

a second lens group including an aspherical third lens which has aspherical surfaces on both sides and has a negative on-axis refracting power;

a third lens group including an aspherical fourth lens which has aspherical surfaces on both sides and has a positive on-axis refracting power; and a positive fourth lens group including, in order from the eye, a positive biconvex fifth lens and a negative biconcave sixth lens, a convex surface of said fifth lens directed toward said sixth lens and a concave surface of said sixth lens directed toward said fifth lens having the same radius of curvature and being bonded to each other.

2. The ocular optical system according to claim 1, a peripheral part of said third lens has a concave surface directed toward the eye.

3. The ocular optical system according to claim 1, a peripheral part of said fourth lens has a concave surface directed toward the eye.

4. The ocular optical system according to claim 1, wherein following conditions are satisfied:

$$1.4 < f_1/f < 2.1$$

$$3.8 < |f_2|/f < 5.4$$

$$2.3 < f_3/f < 3.7$$

$$5 < f_4/f < 450$$

where $f_1$, $f_2$, $f_3$ and $f_4$ represent on-axis focal lengths of said first lens group, said second lens group, said third lens group and said fourth lens group, respectively, and f represents a focal length of the whole ocular optical system.

5. The ocular optical system according to claim 1, wherein a following condition is satisfied:

$$1.1 < f_{12}/f_{34} < 2.2$$

where $f_{12}$ represents a composite on-axis focal length of a combination of said first lens group and said second lens group, and $f_{34}$ represents a composite on-axis focal length of a combination of the third lens group and the fourth lens group.

6. The ocular optical system according to claim 1, wherein following conditions are satisfied:

$$v_2 < 30$$

$$v_3 > 35$$

where $v_2$ represents Abbe number of glass material forming said first lens, and $v_3$ represents Abbe number of glass material forming said second lens.

7. The ocular optical system according to claim 1, wherein following conditions are satisfied:

$$v_5 < 30$$

$$v_7 > 40$$

where $v_5$ represents Abbe number of glass material forming said third lens, and $v_7$ represents Abbe number of glass material forming said fourth lens.

8. The ocular optical system according to claim 1, wherein following conditions are satisfied:

$$v_9 > 35$$

$$v_{10} < 25$$

where $v_9$ represents Abbe number of glass material forming said fifth lens, and $v_{10}$ represents Abbe number of glass material forming said sixth lens.

9. An ocular image display apparatus to be placed in front of a human eye, comprising:

a two-dimensional display means on which an original image is displayed; and an ocular optical system for forming a magnified virtual image of the original image displayed on said two-dimensional display means;

said ocular optical system comprising, in order from the eye:

a positive first lens group including, in order from the eye, a meniscus first lens which has a concave surface directed toward the eye and a positive meniscus second lens which has a concave surface, a convex surface of said first lens directed toward said second lens and said concave surface of said second lens having the same radius of curvature and being bonded to each other;

a second lens group including an aspherical third lens which has aspherical surfaces on both sides and has a negative on-axis refracting power;

a third lens group including an aspherical fourth lens which has aspherical surfaces on both sides and has a positive on-axis refracting power; and a positive fourth lens group including, in order from the eye, a positive biconvex fifth lens and a negative biconcave sixth lens, a convex surface of said fifth lens directed toward said sixth lens and a concave surface of said sixth lens directed toward said fifth lens having the same radius of curvature and being bonded to each other.

10. The ocular image display apparatus according to claim 9, a peripheral part of said third lens has a concave surface directed toward the eye.

11. The ocular image display apparatus according to claim 9, a peripheral part of said fourth lens has a concave surface directed toward the eye.

12. The ocular image display apparatus according to claim 9, wherein following conditions are satisfied:

$$1.4 < f_1/f < 2.1$$

$$3.8 < |f_2|/f < 5.4$$

$$2.3 < f_3/f < 3.7$$

$$5 < f_4/f < 450$$

where $f_1$, $f_2$, $f_3$ and $f_4$ represent on-axis focal lengths of said first lens group, said second lens group, said third lens group and said fourth lens group, respectively, and f represents a focal length of the whole ocular optical system.

13. The ocular image display apparatus according to claim 9, wherein a following condition is satisfied:

$$1.1 < f_{12}/f_{34} < 2.2$$

where $f_{12}$ represents a composite on-axis focal length of a combination of said first lens group and said second lens group, and $f_{34}$ represents a composite on-axis focal length of a combination of the third lens group and the fourth lens group.

14. The ocular image display apparatus according to claim 9, wherein following conditions are satisfied:

$$v_2 < 30$$

$$v_3 > 35$$

where $v_2$ represents Abbe number of glass material forming said first lens, and $v_3$ represents Abbe number of glass material forming said second lens.

15. The ocular image display apparatus according to claim 9, wherein following conditions are satisfied:

$$v_5 < 30$$

$$v_7 > 40$$

where $\nu_5$ represents Abbe number of glass material forming said third lens, and $\nu_7$ represents Abbe number of glass material forming said fourth lens.

16. The ocular image display apparatus according to claim 9, wherein following conditions are satisfied:

$$\nu_9 > 35$$
$$\nu_{10} < 25$$

where $\nu_9$ represents Abbe number of glass material forming said fifth lens, and $\nu_{10}$ represents Abbe number of glass material forming said sixth lens.

* * * * *